(12) United States Patent
Fujisawa

(10) Patent No.: US 9,969,590 B2
(45) Date of Patent: May 15, 2018

(54) HORIZONTAL-PULL COATING FILM TRANSFERRING TOOL

(71) Applicant: Tombow Pencil Co., Ltd., Tokyo (JP)

(72) Inventor: Hiromichi Fujisawa, Tokyo (JP)

(73) Assignee: Tombow Pencil Co., Ltd. (JP)

( * ) Notice: Subject to any disclaimer, the term of this patent is extended or adjusted under 35 U.S.C. 154(b) by 0 days. days.

(21) Appl. No.: 15/478,969

(22) Filed: Apr. 4, 2017

(65) Prior Publication Data

US 2017/0369267 A1 Dec. 28, 2017

Related U.S. Application Data

(63) Continuation of application No. PCT/JP2017/011867, filed on Mar. 23, 2017.

(30) Foreign Application Priority Data

Jun. 24, 2016 (JP) .................................. 2016-125689

(51) Int. Cl.
*B65H 37/00* (2006.01)
*B32B 37/00* (2006.01)
(Continued)

(52) U.S. Cl.
CPC ............ *B65H 37/007* (2013.01); *B32B 37/00* (2013.01); *B32B 37/0053* (2013.01); *B32B 37/26* (2013.01); *B65H 16/00* (2013.01); *B65H 18/08* (2013.01)

(58) Field of Classification Search
CPC ..... B32B 37/00; B32B 37/0053; B32B 37/26; B65H 16/00; B65H 18/08; B65H 37/007
(Continued)

(56) References Cited

U.S. PATENT DOCUMENTS 5,759,341 A 6/1998 Kobayashi
7,228,882 B2 6/2007 Marschand et al.
(Continued)

FOREIGN PATENT DOCUMENTS

EP 0427870 A1 5/1991
JP 05-178525 7/1993
(Continued)

OTHER PUBLICATIONS

Jun. 27, 2017, International Search Report and Written Opinion of the International Searching Authority from the Japanese Patent Office in PCT/JP2017/011867, which is the international application to which this U.S. application is a continuing application and claims the benefit of priority.

*Primary Examiner* — Mark A Osele
*Assistant Examiner* — Nickolas Harm
(74) *Attorney, Agent, or Firm* — Kolisch Hartwell, P.C.

(57) ABSTRACT

A horizontal-pull coating film transferring tool may include a supply reel, a transfer head, a take-up reel, and a power transmitting mechanism. The tool may also include a base member, wherein a transfer head is attached and a rotation locking member having a supply reel engaging pawl able to lock rotation of the supply reel is disposed. The base member may be supported so as to be able to rotate. Through an elastic return mechanism, a rotational lock of the supply reel is released through rotation of the base member when the transfer head is pressed and the rotation of the supply reel is locked through the base member returning to an original position. A rotation supporting shaft for the supply reel and the take-up reel is disposed so as to be substantially perpendicular to the direction of a pressing edge portion on the front end in the transfer head.

20 Claims, 29 Drawing Sheets

(51) Int. Cl.
  *B65H 16/00* (2006.01)
  *B65H 18/08* (2006.01)
  *B32B 37/26* (2006.01)

(58) Field of Classification Search
  USPC ..... 156/540, 574, 577, 579; 242/160.4, 171, 242/588, 588.2, 588.3, 588.6; 118/76, 118/200, 257
  See application file for complete search history.

(56) References Cited

U.S. PATENT DOCUMENTS

| | | | |
|---|---|---|---|
| 2002/0088554 A1* | 7/2002 | Bouveresse | B65H 37/007 156/577 |
| 2009/0050275 A1* | 2/2009 | Sakanishi | B43L 19/0068 156/538 |
| 2009/0205785 A1 | 8/2009 | Rolion et al. | |
| 2010/0084095 A1* | 4/2010 | Sekiya | B65H 37/007 156/378 |

FOREIGN PATENT DOCUMENTS

| | | |
|---|---|---|
| JP | 06073025 U | 10/1994 |
| JP | H09-71097 A | 3/1997 |
| JP | 2876301 B2 | 4/1997 |
| JP | H09-104562 A | 4/1997 |
| JP | H09-124219 A | 5/1997 |
| JP | H10-52995 A | 2/1998 |
| JP | 10-181289 A | 7/1998 |
| JP | 11-1095 | 1/1999 |
| JP | 2005-47201 A | 2/2005 |
| JP | 3870986 B2 | 1/2007 |
| JP | 2011-121204 A | 6/2011 |
| JP | 2011-245696 A | 12/2011 |
| JP | 2016-124131 A | 7/2016 |

* cited by examiner

FIG. 1
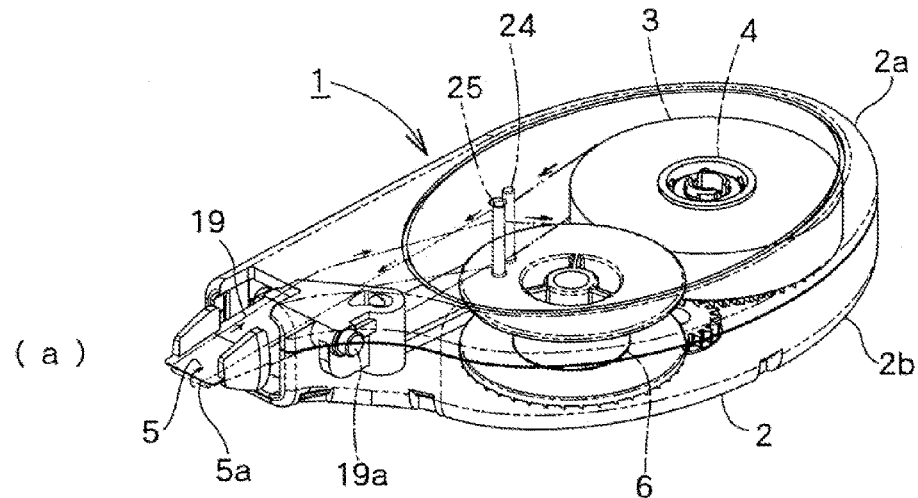
(a)
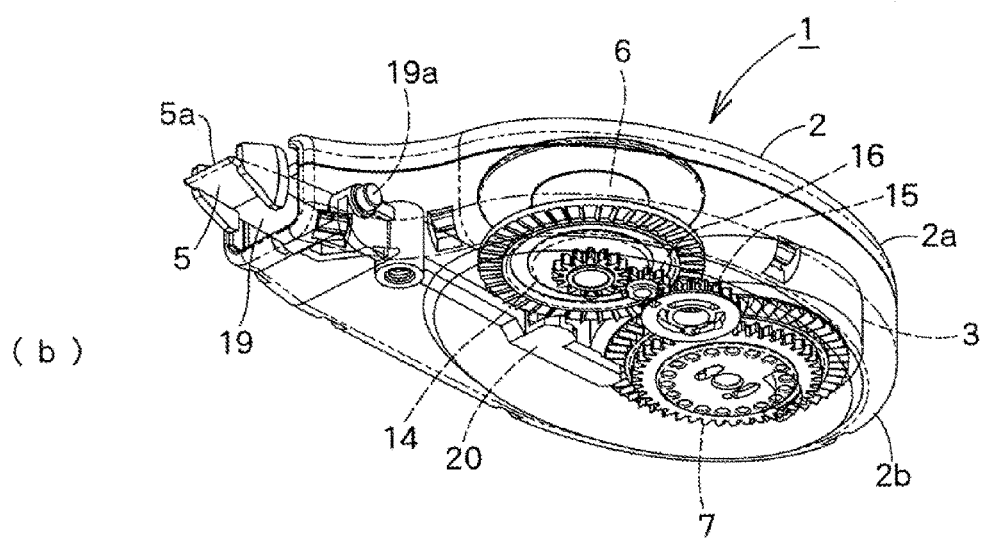
(b)

FIG. 16
(a)
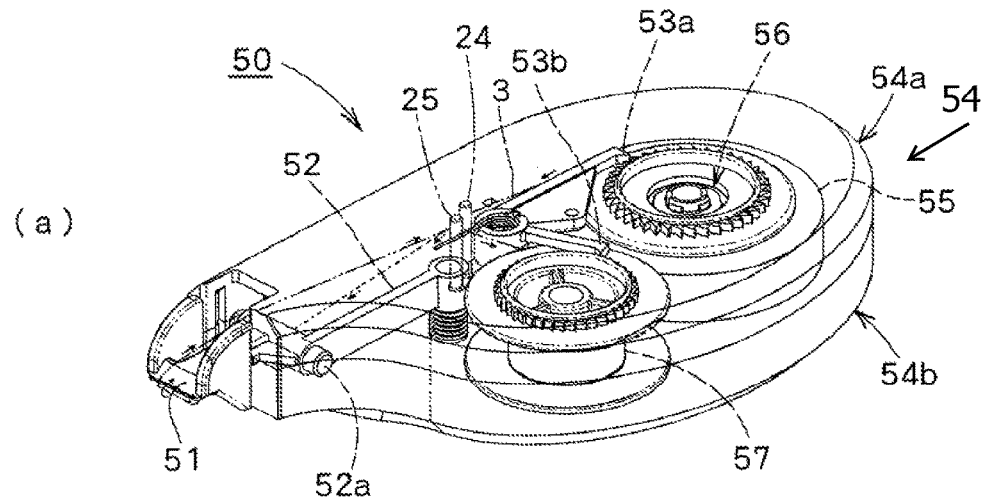
(b)
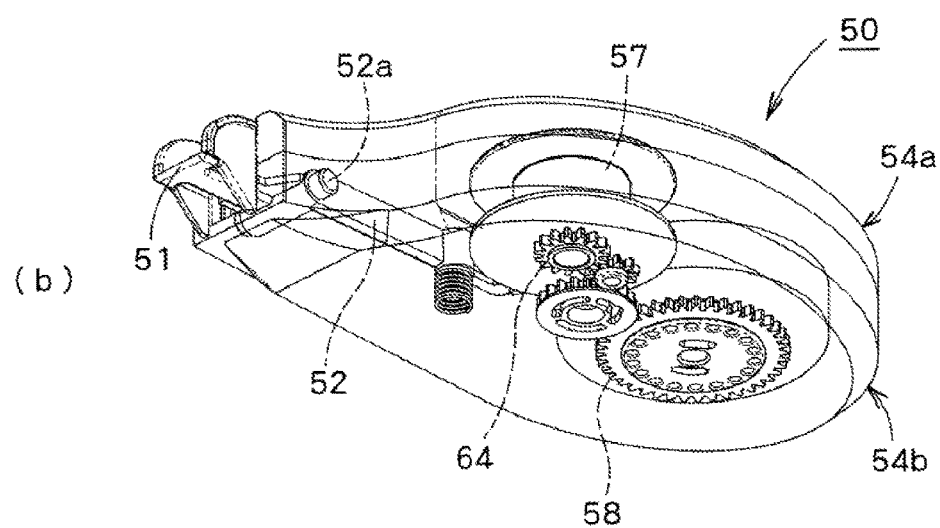

FIG. 19
(a) 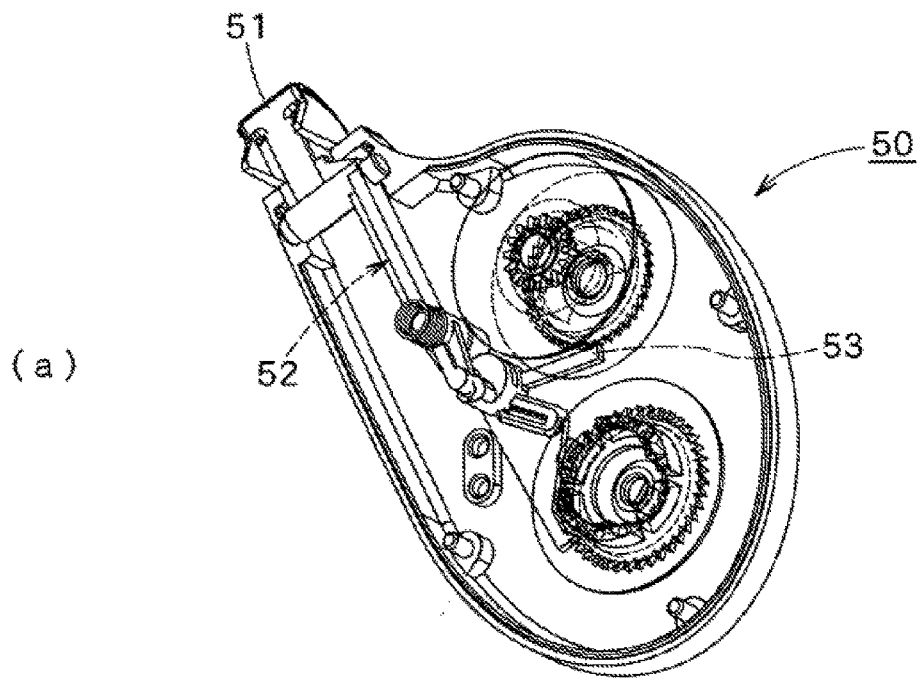
(b) 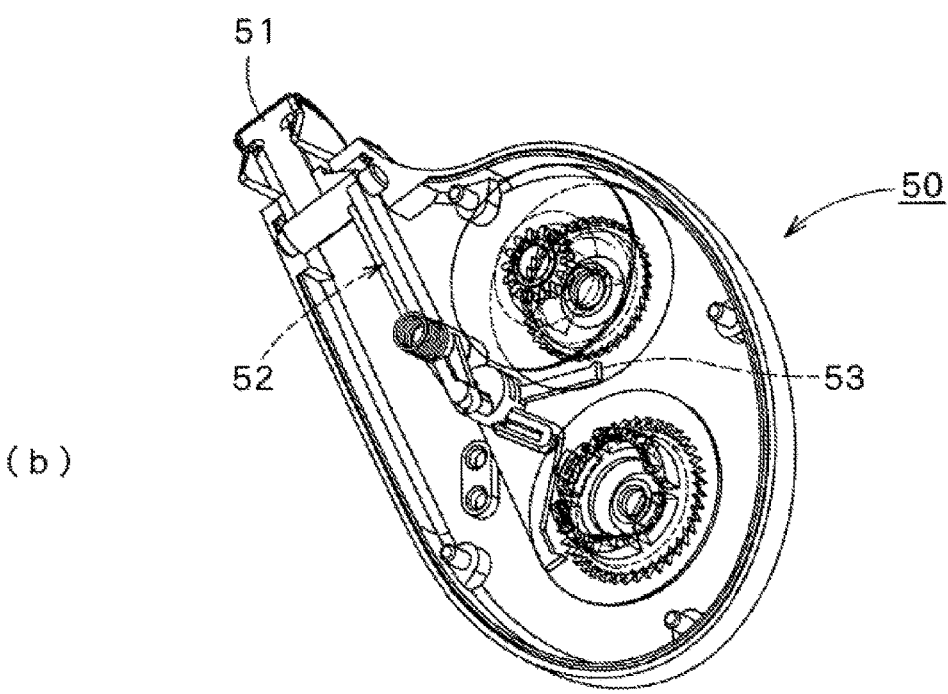

(a) (b)

FIG. 25
(a)
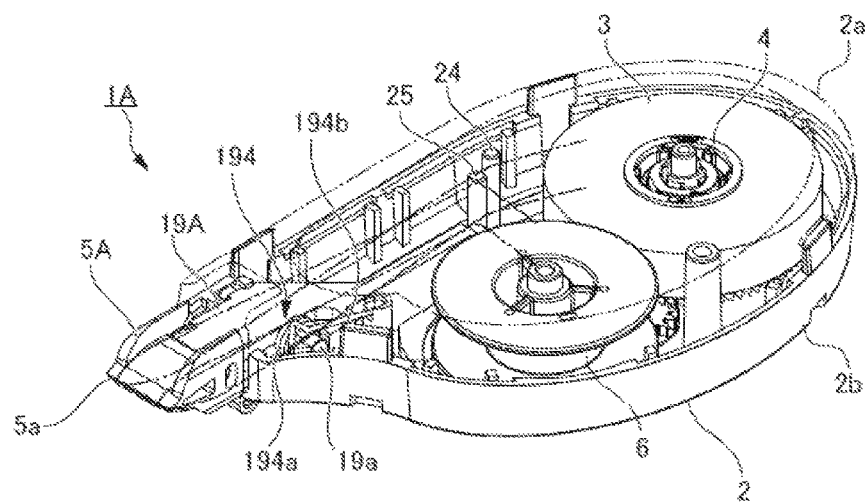
(b)
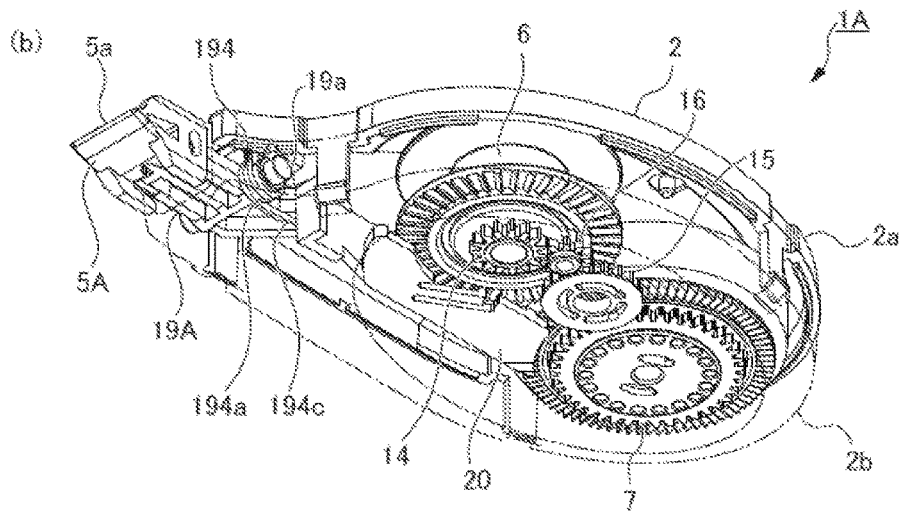

HORIZONTAL-PULL COATING FILM TRANSFERRING TOOL

CROSS REFERENCE TO RELATED APPLICATIONS

This application claims priority to Japanese Patent Application No. 2016-125689, filed Jun. 24, 2016, and this application is also a continuation of PCT/JP2017/011867, filed Mar. 23, 2017, which also claims priority to Japanese Patent Application No. 2016-125689, filed Jun. 24, 2016, all of which are hereby incorporated by reference.

INTRODUCTION

Typically, in coating film transferring tools, automatic rolling-type coating film transferring tools are broadly used wherein a supply reel, onto which is rolled a transfer tape, and a take-up reel, onto which is rolled the transfer tape after use, operate in coordination, through a power transmission mechanism, within a case, wherein the force of restitution of an elastic body, such as a spring, is used to produce the torque of the take-up reel or supply reel through frictional force that is produced on a sliding surface between components.

During use, a transfer head is pressed against a transfer-destination surface, such as paper, or the like, and is moved to not only pull the transfer tape from the supply reel, but also to transfer the coating film of the transfer tape onto the transfer-destination surface.

Simultaneously with the completion of the transfer, the coating film that has been transferred to the transfer-destination surface and the coating film on the transfer tape side that has not yet been transferred are severed by the coating film transferring tool moving away from the transfer-destination surface, where, in this case, a "stringing" phenomenon may occur. This stringing phenomenon is a phenomenon wherein more of the transfer tape than is necessary is pulled from the supply reel, rather than the coating film being severed cleanly, or wherein a portion of the coating film that has been transferred to the transfer-destination surface peels off. This phenomenon is caused by the supply reel sometimes rotating as the coating film transferring tool moves away from the transfer-destination surface.

As a countermeasure, an invention is disclosed in, for example, Japanese Unexamined Patent Application Publication H5-178525 wherein a rotation preventing member with an arc-shaped arm that has elastic resiliency is provided integrally with the transfer head, so that, when not in use, the rotation of the supply reel gear is prevented by the rotation preventing member, and when in use, when the transfer head is pressed against the transfer-destination surface, the prevention of rotation of the supply reel gear is released. However, the rotation preventing member tended to become deformed, so there were concerns regarding the occurrence of, for example, unintentional release of the prevention of rotation, reducing the reliability with which the rotation is prevented.

Moreover, Japanese Unexamined Patent Application Publication H11-1095, submitted by the present applicant, describes an invention wherein a transfer head that has a stopper on one end that meshes with a take-up reel gear is provided so as to rotate, to prevent rotation of the take-up reel gear when not in use; however, the supply reel operated in coordination with the take-up reel gear through a slipping mechanism, and thus the supply reel was not stopped completely. Moreover, structuring so as to prevent the rotation of the supply reel using ways such as disclosed in Japanese Unexamined Patent Application Publication H11-1095 is difficult.

Because of this, the applicant submitted the patent application in Japanese Patent Application 2014-264838, which has, as the problem to be solved, that of providing a coating film transferring tool that prevents the phenomenon of stringing, through locking the rotation of the supply reel reliably simultaneously with the completion of the operation for transferring to the transfer-destination surface, and that also minimizes extraneous movement of the transfer head at the beginning of the transfer operation, to enable use with a pleasing feel in use. Japanese Patent Application 2014-264838 describes, as an embodiment, a horizontal-pull coating film transferring tool.

On the other hand, typically, depending on user preferences and the application, a horizontal-pull coating film transferring tool, similar to the horizontal-pull coating film transferring tool, is also used broadly.

However, the specific structures of the embodiments disclosed in Japanese Patent Application 2014-264838, even if applied as they are, do not structure a horizontal-pull coating film transferring tool.

SUMMARY

In one or more embodiments, the present invention relates to a horizontal-pull coating film transferring tool equipped with a transfer tape for correction or adhesion, or the like.

In one or more embodiments of the present invention, the problem to be solved is to provide a horizontal-pull coating film transferring machine able to prevent effectively the stringing phenomenon by severing the transfer tape properly by locking the rotation of the supply reel reliably simultaneously with the end of the operation for transferring to the transfer-destination surface.

Moreover, in one or more embodiments of the present invention, the problem to be solved is to provide a horizontal-pull coating film transferring tool wherein the rotation of the take-up reel is locked when the coating film transferring tool is not in use, and wherein, when in use, the rotational resistance of the take-up reel is reduced and wherein it is possible to prevent the production of noise that is produced through contact of an elastic ratchet pawl, as is generally used.

In one or more embodiments of the present invention, the problem set forth above may be solved through one or more, or a combination of more than one, of the following aspects of one or more embodiments of the present invention:

(1) A horizontal-pull coating film transferring tool comprising, within a case, a supply reel on which a transfer tape is rolled, a transfer head for transferring, to a transfer-destination surface, a transfer tape that is pulled from the supply reel, a take-up reel for rolling up the transfer tape after transferring, and a power transmitting mechanism for causing the supply reel and the take-up reel to operate in coordination, structured so that: a base member wherein a transfer head is attached, either integrally or replaceably through a cartridge system, to the front end and wherein a rotation locking member having a supply reel engaging pawl able to lock the rotation of the supply reel is disposed, in the back half portion, so as to operate either directly or through a linkage, is supported between the transfer head and the rotation locking member so as to be able to rotate on a base member pivoting supporting portion that is provided in a prescribed position in the case, is structured so that, through an elastic return mechanism between the base member and the case, the rotational lock of the supply reel is released through rotation of the base member when the transfer head is pressed against the transfer-destination surface and the rotation of the supply reel is locked through the base member returning to the original position through the elastic return mechanism, and wherein a rotation supporting shaft for the supply reel and the take-up reel is disposed so as to be substantially perpendicular to the direction of a pressing edge portion on the front end in the transfer head, for pressing the transfer tape against the transfer-destination surface.

Doing this enables the horizontal-pull coating film transferring tool to be structured easily, and enables the provision of a horizontal-pull coating film transferring tool able to prevent the stringing phenomenon easily through severing the transfer tape properly through locking the rotation of the supply reel reliably, simultaneously with the end of the operation for transferring to the transfer-destination surface.

(2) A horizontal-pull coating film transferring tool as set forth in (1), structured so that: the supply reel engaging pawl in the rotation locking member is a supply reel engaging pawl able to engage with an engaging tooth that is provided on the circular face or a peripheral edge of a flange that is formed integrally with the supply reel, and through the engagement between the engaging tooth and the supply reel engaging pawl being disengaged through rotation of the base member when the transfer head is pressed against the transfer destination surface, the rotational lock of the supply reel is released, and when the pressure on the transfer head is removed, the base member is returned to the original position by the elastic return mechanism, and the supply reel engaging pawl engages the engaging tooth, locking the rotation of the supply reel.

The use of this structure enables the easy provision of a horizontal-pull coating film transferring tool that has the effects of (1), above.

(3) A horizontal-pull coating film transferring tool as set forth in (1) or (2), structured so that: a take-up reel engaging pawl able to engage with an engaging tooth that is provided on the circular face or a peripheral edge of a flange that is formed integrally with the take-up reel is provided in the rotation locking member, and through the engagement between the engaging tooth and the take-up reel engaging pawl being disengaged through rotation of the base member when the transfer head is pressed against the transfer destination surface, the rotational lock of the take-up reel is released, and when the pressure on the transfer head is removed, the base member is returned to the original position by the elastic return mechanism, and the take-up reel engaging pawl engages the engaging tooth, locking the rotation of the take-up reel.

The use of this structure enables the provision of a horizontal-pull coating film transferring tool wherein the rotation of the take-up reel is locked when the coating film transferring tool is not in use, and wherein, when in use, the rotation resistance of the take-up reel is reduced and the production of noise that is produced through contact with an elastic ratchet pawl is reduced.

(4) A horizontal-pull coating film transferring tool as set forth in (1) or (2), structured so that the power transmitting mechanism is structured from a plurality of gears, wherein a gear engaging pawl, for engaging an engaging tooth that is provided on an arbitrary gear, from among the plurality of gears, is provided, wherein, when the transfer head is pressed against the transfer-destination surface, the base member rotates, to release the engagement of the engaging tooth and the gear engaging pawl, so that the rotational lock of the take-up gear is released, and when the pressure on the transfer head is removed, the base member is returned to the original position through the elastic return mechanism, so that the gear engaging pawl will be engaged with the engaging tooth, so that the rotation of the take-up reel will be locked.

The use of this structure enables the provision of a horizontal-pull coating film transferring tool that has the same effects as (3), above.

(5) A horizontal-pull coating film transferring tool as set forth in (3), which is dependent on (2), or in (4), which is dependent on (2), structured so that the engagement of the engaging tooth of the flange of the take-up reel and the take-up reel engaging pawl, or the engagement of the engaging tooth that is provided in an arbitrary gear, of the plurality of gears that structure the power transmitting mechanism, and the gear engaging pawl, is released by the rotation of the base member, to release the rotational lock of the take-up reel, when the transfer head is pressed against the transfer destination surface prior to the engagement of the engaging tooth of the supply reel and the supply reel engaging pawl.

The use of this structure enables slack in the transfer tape to be taken up through enabling rotation of the take-up reel even when taking up slack when not in use in a state wherein the rotation of the supply reel has been stopped, through rotation of the supply reel gear through an opening window that is provided in the case member.

(6) A horizontal-pull coating film transferring tool as set forth in any of (2) through (5), wherein: the supply reel engaging pawl, take-up reel engaging pawl, and/or gear engaging pawl is provided protruding in a direction that is substantially perpendicular in relation to the direction of the front edge portion of the front end of the transfer head for pressing the transfer tape against the transfer destination surface.

The use of this structure enables easy structuring of a mechanism wherein a supply reel engaging pawl, a take-up reel engaging pawl, and a gear engaging pawl arm are able to engage or release non-engaged teeth that are engaged respectively by these pawls, depending on whether or not a pressing edge portion of the transfer edge is not or is pressed, respectively, against the transfer-destination surface.

(7) A horizontal-pull coating film transferring tool as set forth in any of (1) through (6), wherein: the base member is disposed in a space between the lengthwise-direction axis of the transfer head and the rotation-supporting shaft of the take-up reel.

The use of this structure enables the provision of a horizontal-pull coating film transferring tool having a compact case, through to the ability to contain the base member, and the like, within a case, without wasteful use of space.

One or more embodiments of the present invention can provide a horizontal-pull coating film transferring tool able to prevent effectively the stringing phenomenon through properly severing the transfer tape through locking the rotation of the supply reel reliably simultaneously with the completion of the operation for transferring to the transfer-destination surface.

Moreover, in one or more embodiments of the present disclosure, a horizontal-pull coating film transferring tool can be provided wherein the rotation of the take-up reel is locked when the coating film transferring tool is not in use, and that can prevent the occurrence of noise that is produced through contact of an elastic ratchet pawl, and that can reduce the rotational resistance of the take-up reel when in use.

BRIEF DESCRIPTIONS OF THE DRAWINGS

FIG. 1 is perspective diagrams illustrating a first embodiment of a horizontal-pull coating film transferring tool according to the present invention, wherein (a) is a downward looking perspective diagram and (b) is an upward looking perspective diagram.

Figure 5:
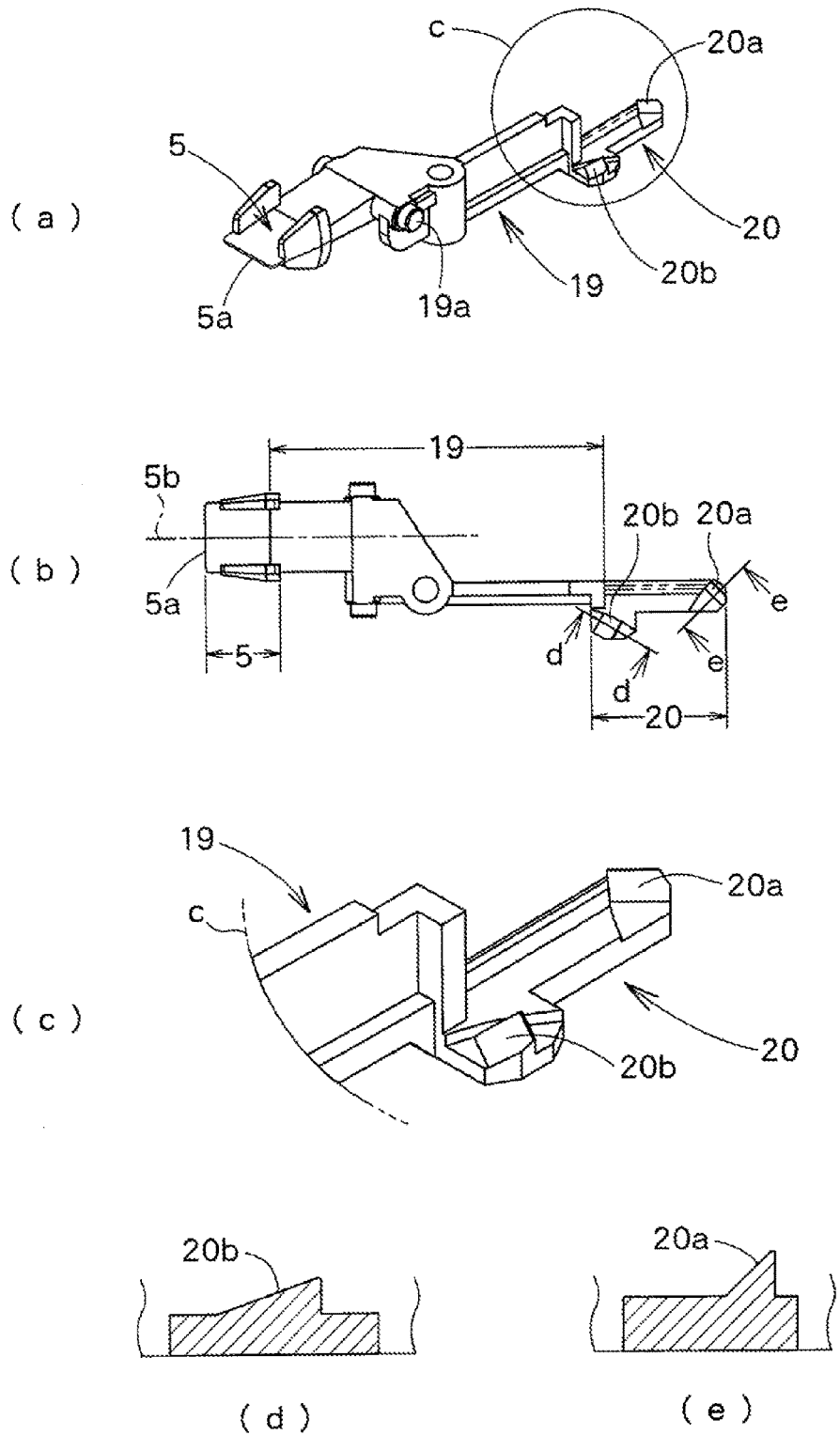

FIG. 5 is diagrams illustrating a base member with a transfer head attached to the front end thereof and a rotation locking member disposed in the back half portion thereof, wherein (a) is a downward looking perspective diagram, (b) is a plan view, (c) is a partial enlarged view within the dotted circle (c) given (a), and (d) and (e) are lateral sectional views of sections d-d and e-e, respectively, in (b).

Figure 6:
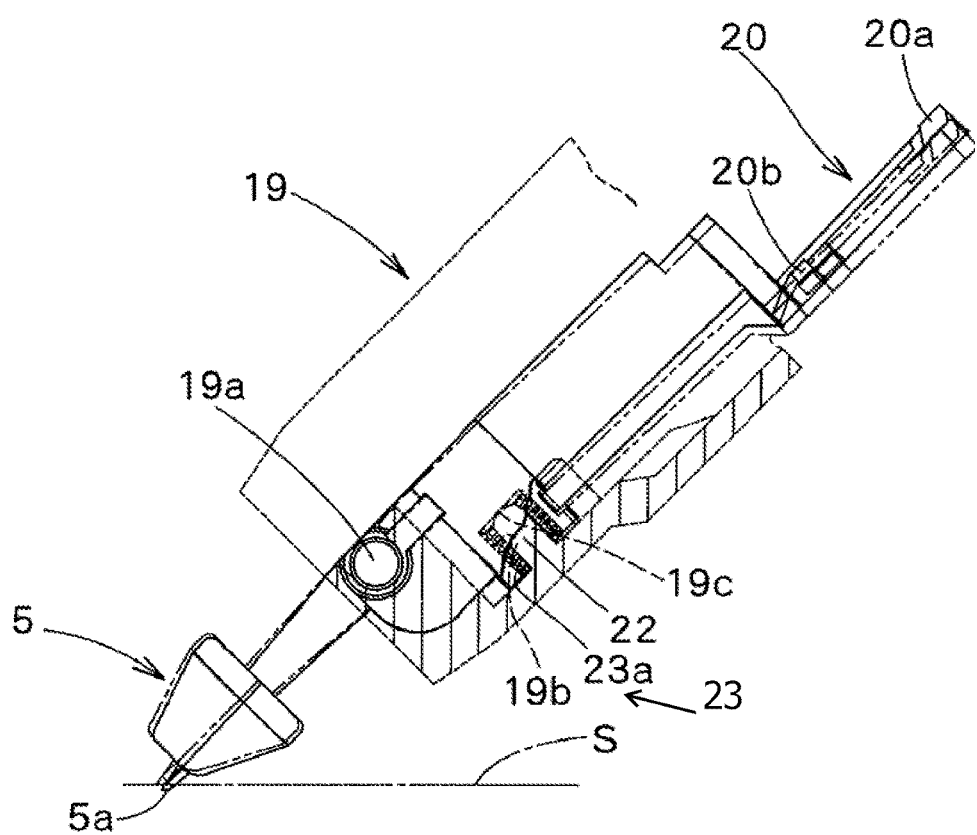

FIG. 6 illustrates the form wherein a base member, having a transfer head attached to the front end thereof and wherein a rotation locking member is disposed in the back half portion thereof, is supported, so as to enable rotation, on a base member pivoting supporting portion that is provided on a case, wherein the solid lines show a state wherein the horizontal-pull coating film transferring tool is not in use, and the imaginary lines show a state wherein the horizontal-pull coating film transferring tool is in use.

Figure 7:
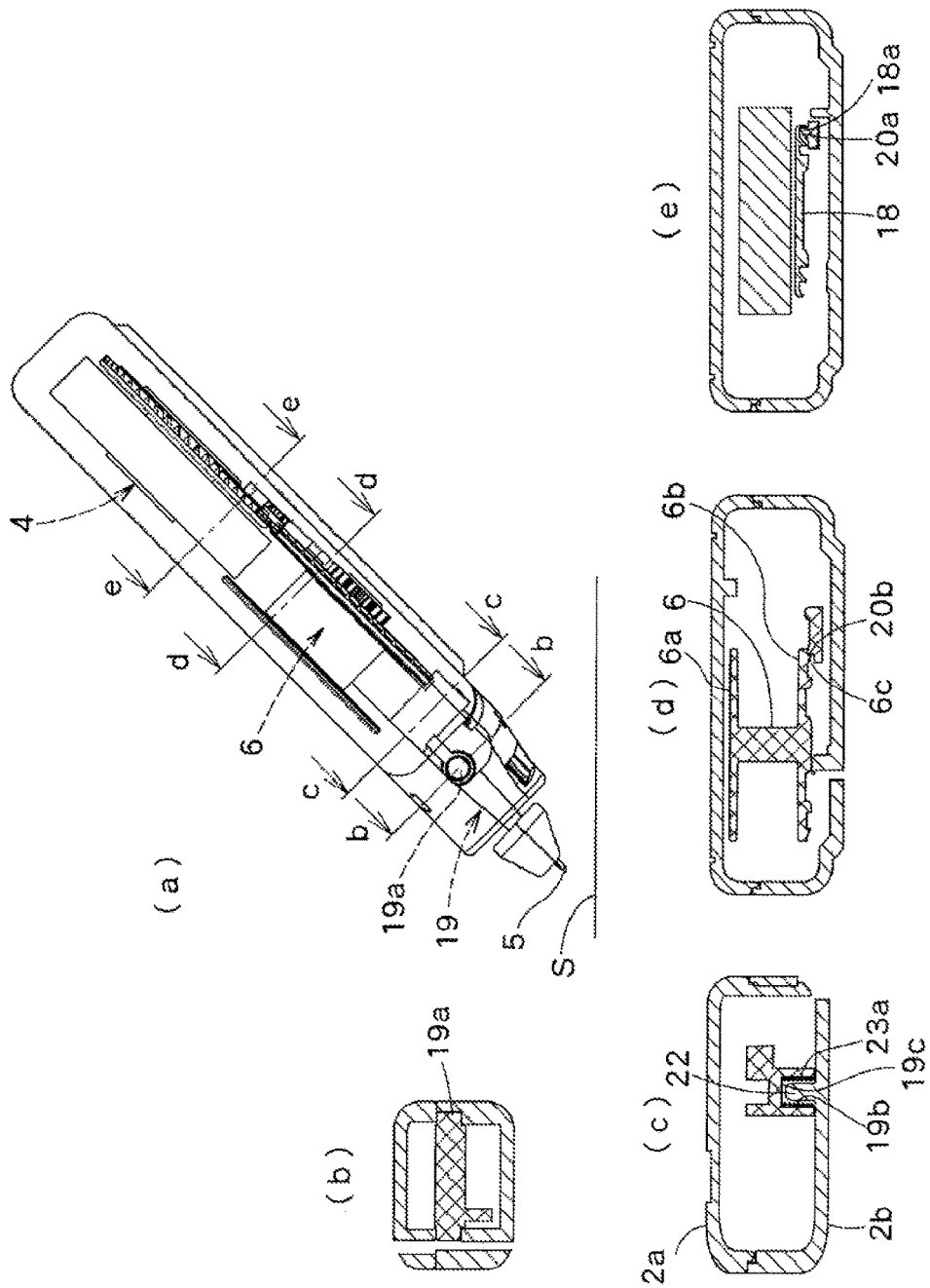

FIG. 7 illustrates a state when not in use, wherein (a) is the horizontal-pull coating film transferring tool, and (b), (c), (d), and (e), respectively, are a lateral sectional view of the section b-b, a lateral sectional view of the section c-c, a lateral sectional view of the section d-d, and a lateral sectional view of the section e-e.

Figure 8:
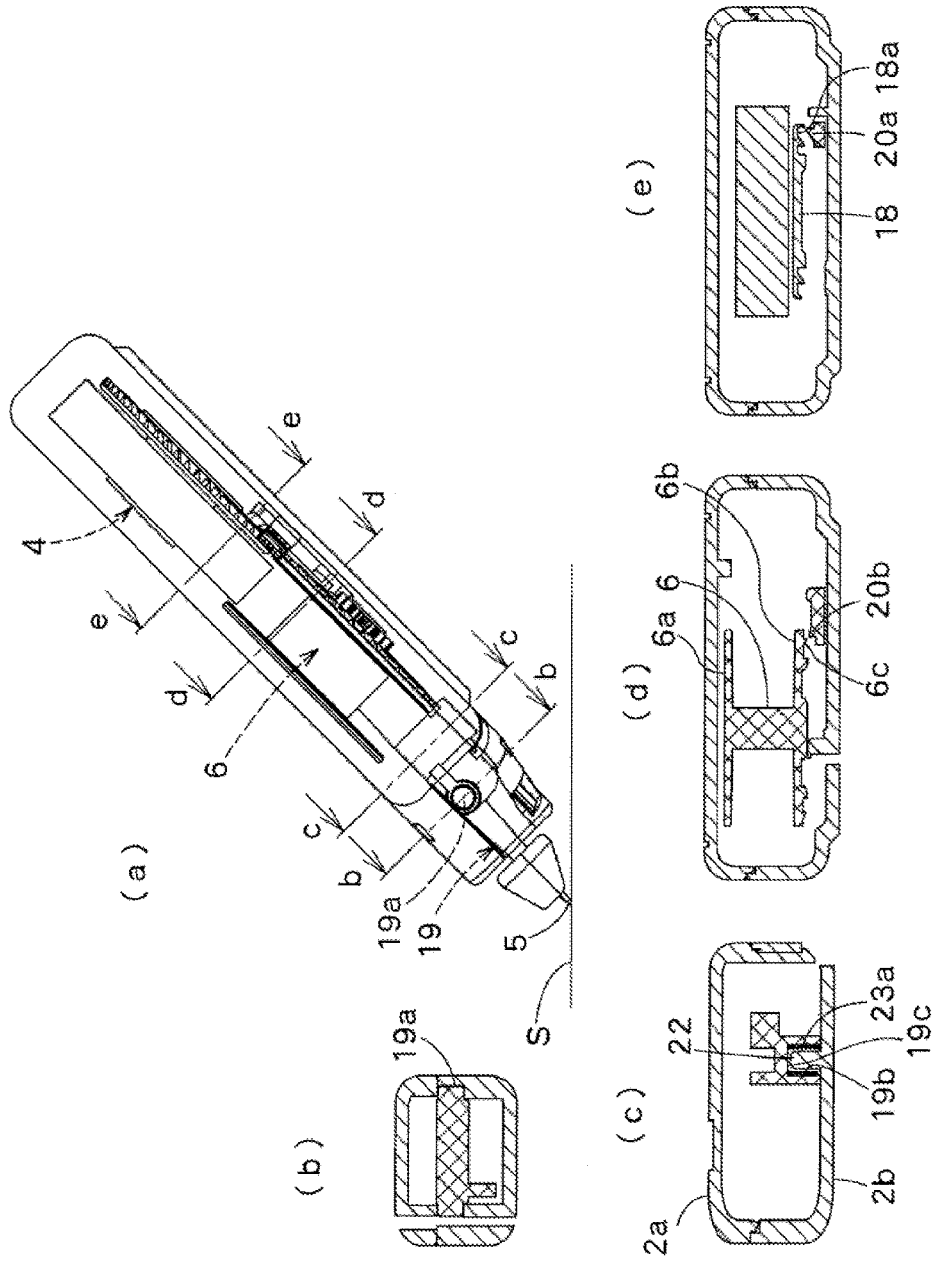

FIG. 8 illustrates a state when the horizontal-pull coating film transferring tool is in use, wherein (a) is the horizontal-pull coating film transferring tool, and (b), (c), (d), and (e), respectively, are a lateral sectional view of the section b-b, a lateral sectional view of the section c-c, a lateral sectional view of the section d-d, and a lateral sectional view of the section e-e.

Figure 9:
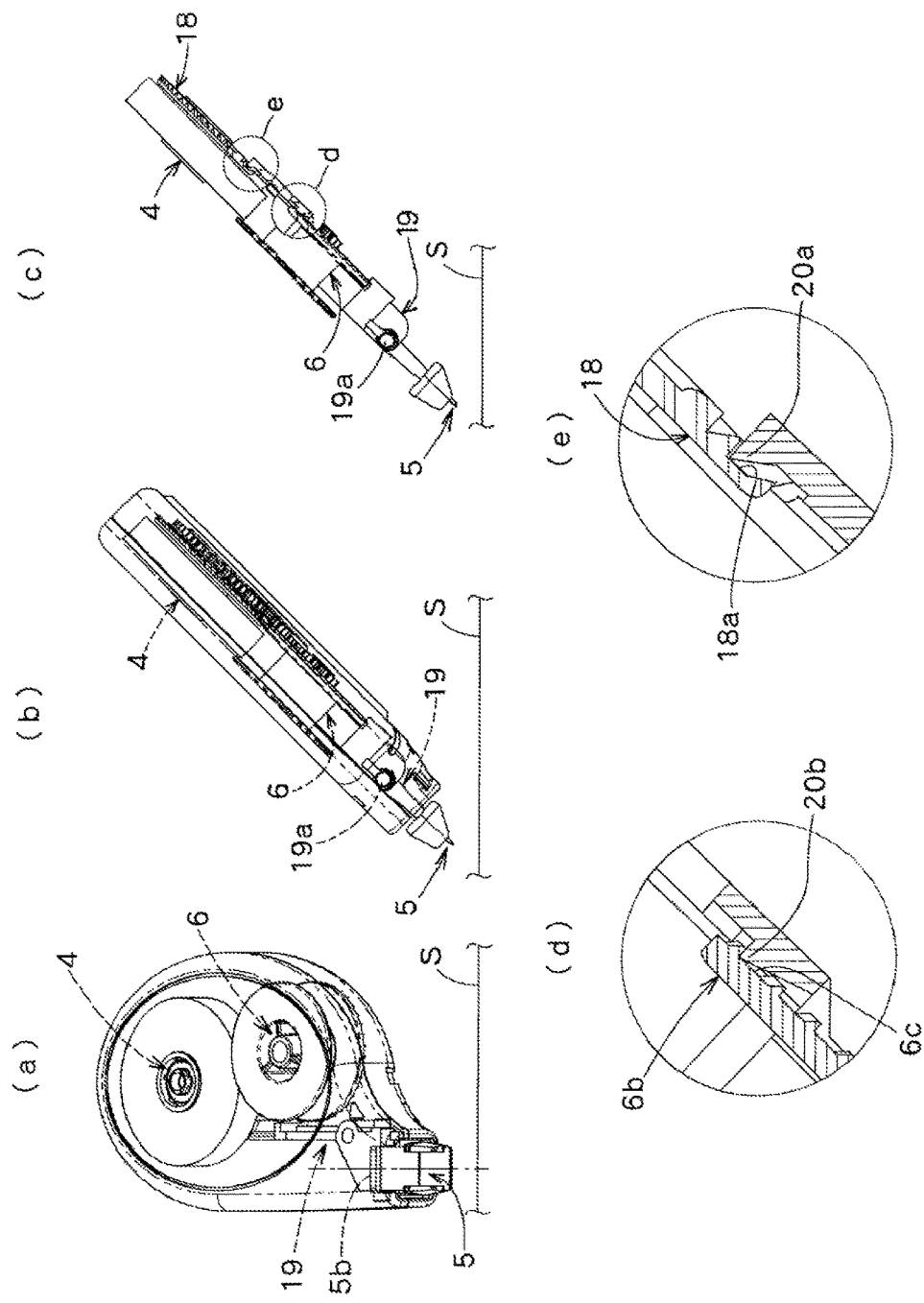

FIG. 9 illustrates a state wherein the horizontal-pull coating film transferring tool is not in use, wherein (a) is an upward looking perspective front view, (b) is a right side view of (a), (c) is a right side view with the case, and the like, removed, (d) is a partial enlarged view within the circle d in (c), and (e) is a partial enlarged view within the circle e in (c).

Figure 10:
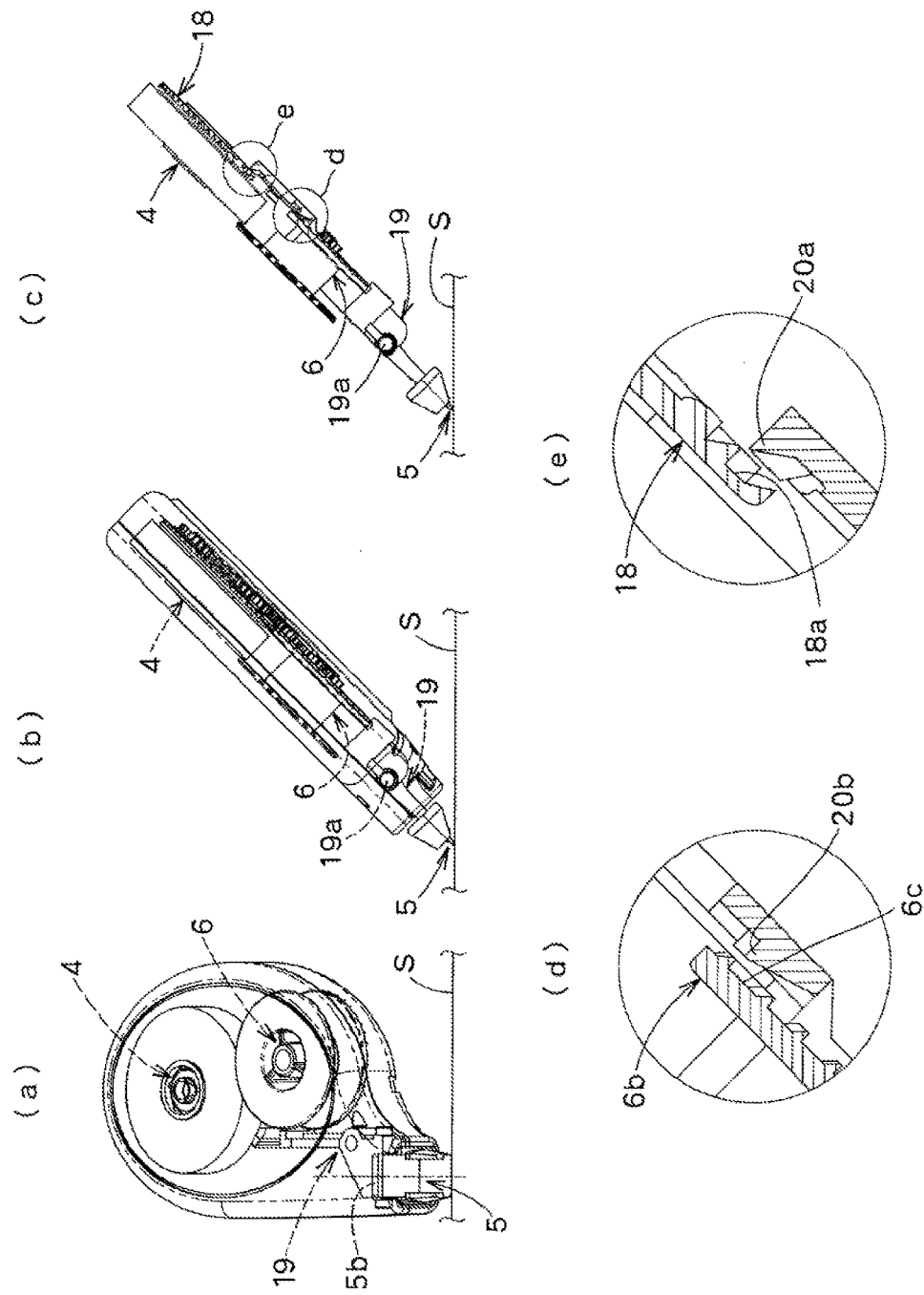

FIG. 10 illustrates a state wherein the horizontal-pull coating film transferring tool is in use, wherein (a) is an upward looking perspective front view, (b) is a right side view of (a), (c) is a right side view with the case, and the like, removed, (d) is a partial enlarged view within the circle d in (c), and (e) is a partial enlarged view within the circle e in (c).

Figure 11:
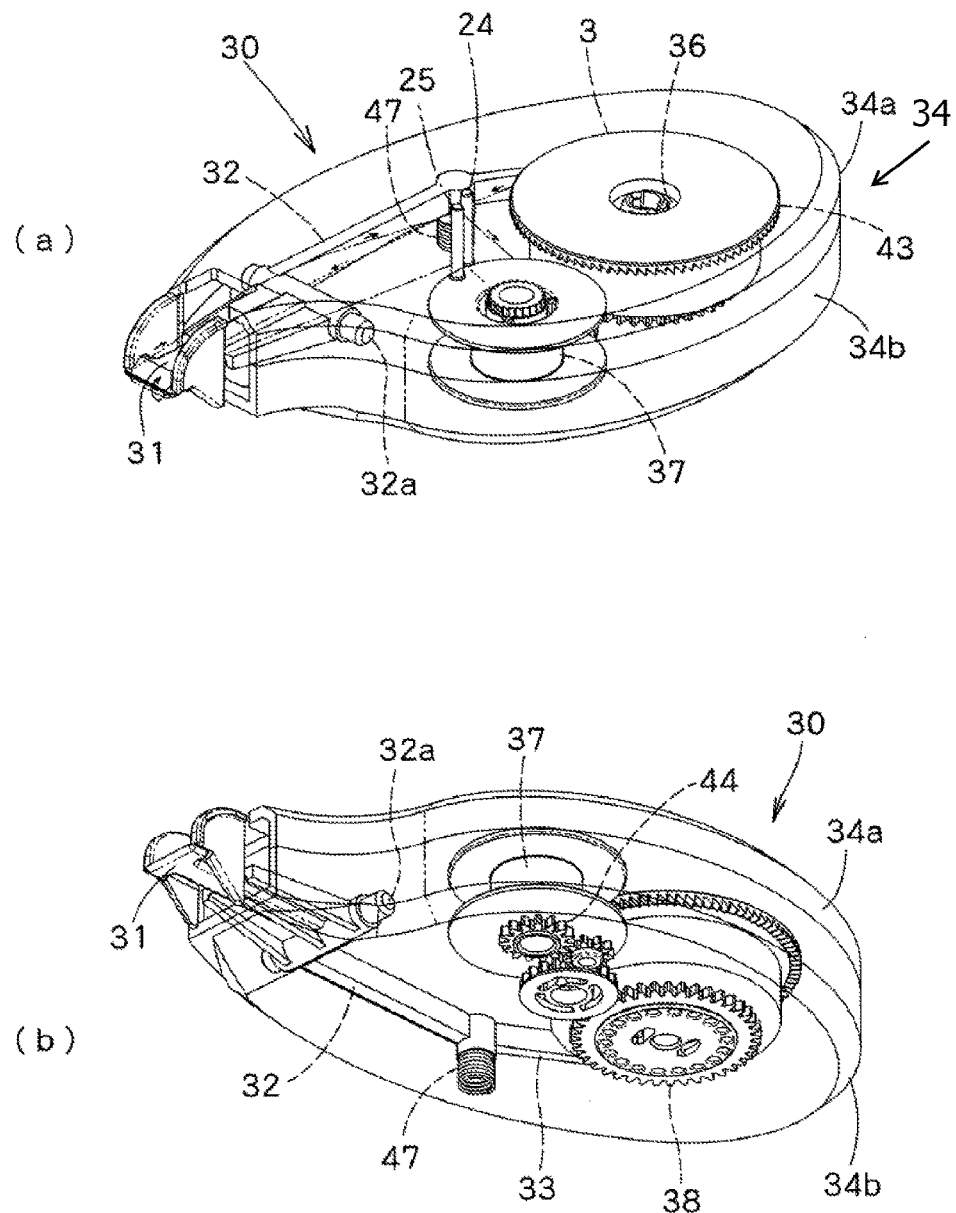

FIG. 11 is perspective diagrams illustrating a second embodiment of a horizontal-pull coating film transferring tool according to the present invention, wherein (a) is a downward looking perspective diagram and (b) is an upward looking perspective diagram.

Figure 12:
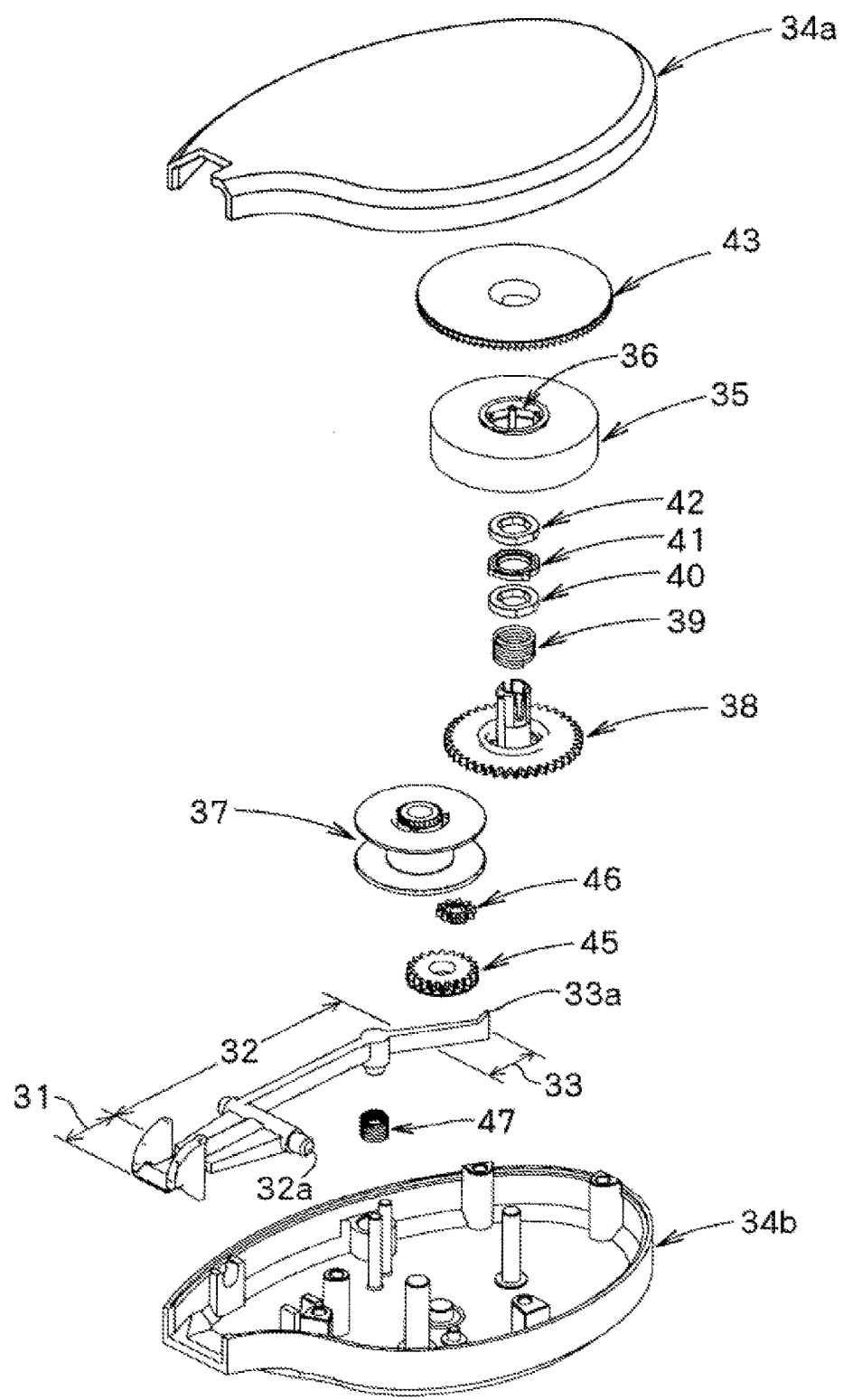

FIG. 12 is a downward looking perspective exploded view of the horizontal-pull coating film transferring tool illustrated in FIG. 11.

Figure 13:
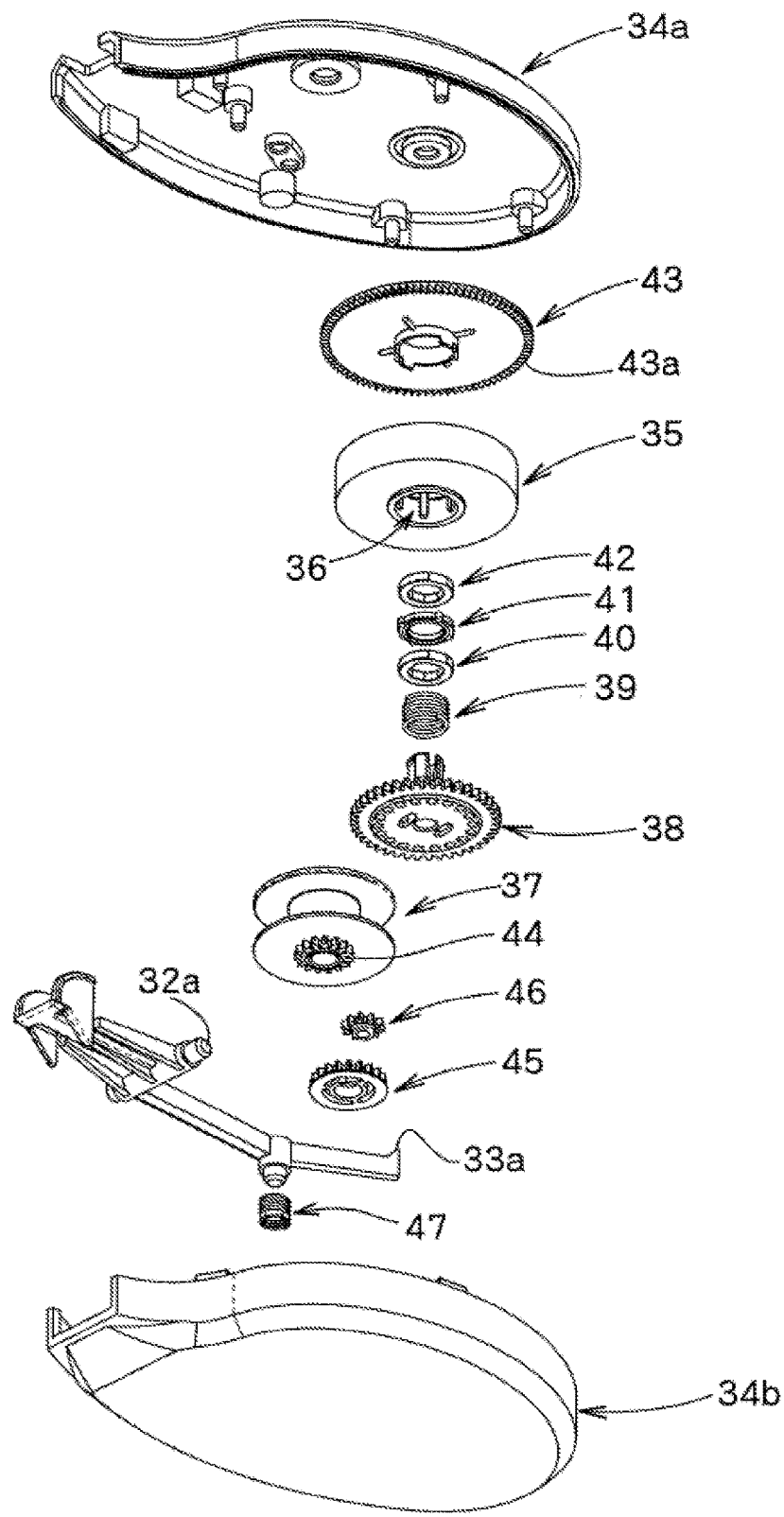

FIG. 13 is, similarly, an upward looking perspective exploded view of the horizontal-pull coating film transferring tool illustrated in FIG. 11.

Figure 14:
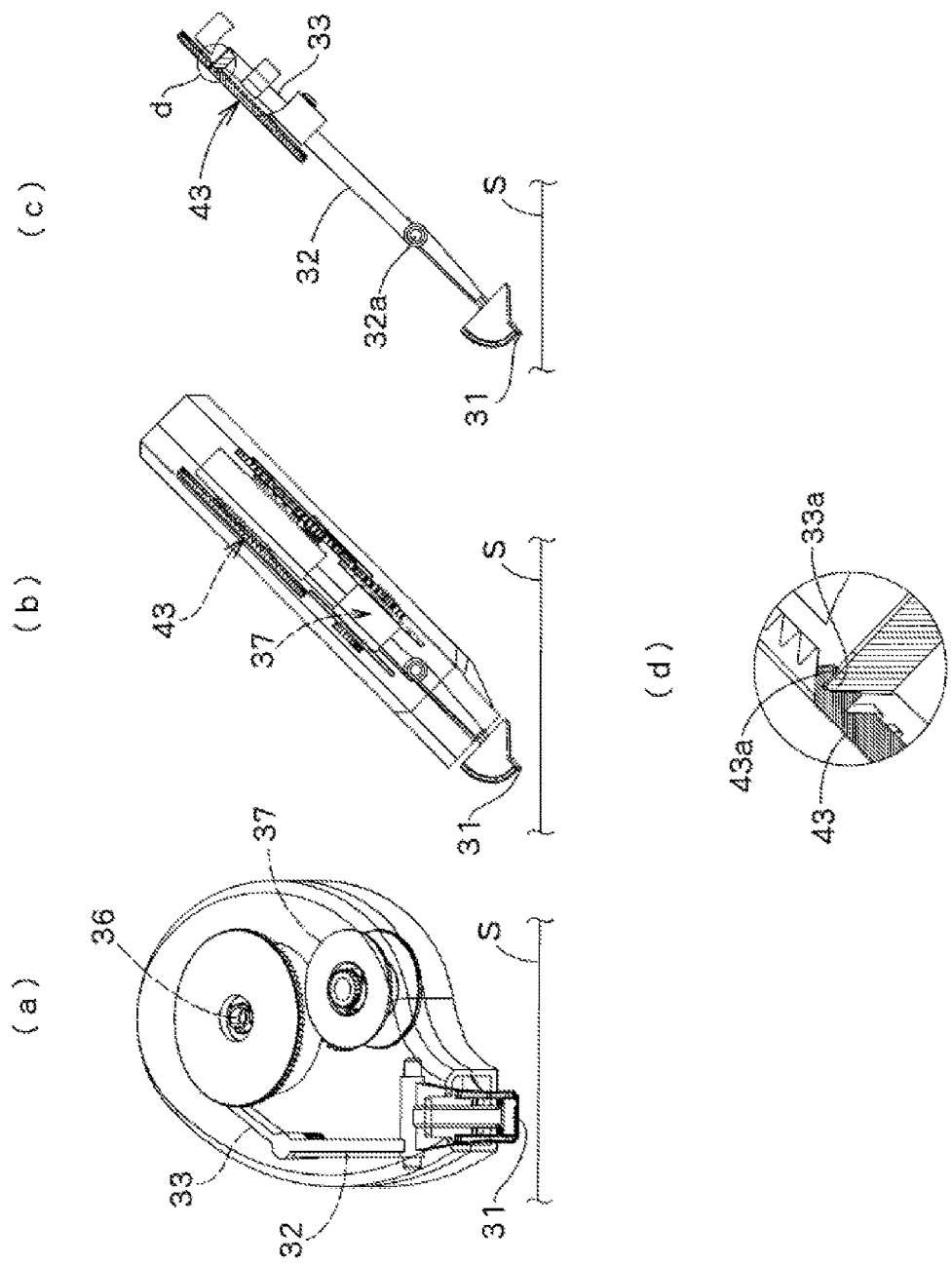

FIG. 14 illustrates a state wherein the horizontal-pull coating film transferring tool is not in use, wherein (a) is a downward looking perspective diagram, (b) is a right side view of (a), (c) is a right side view with the case, the take-up reel, and the like, removed, and (d) is a partial enlarged view within the circle d in (c).

Figure 15:
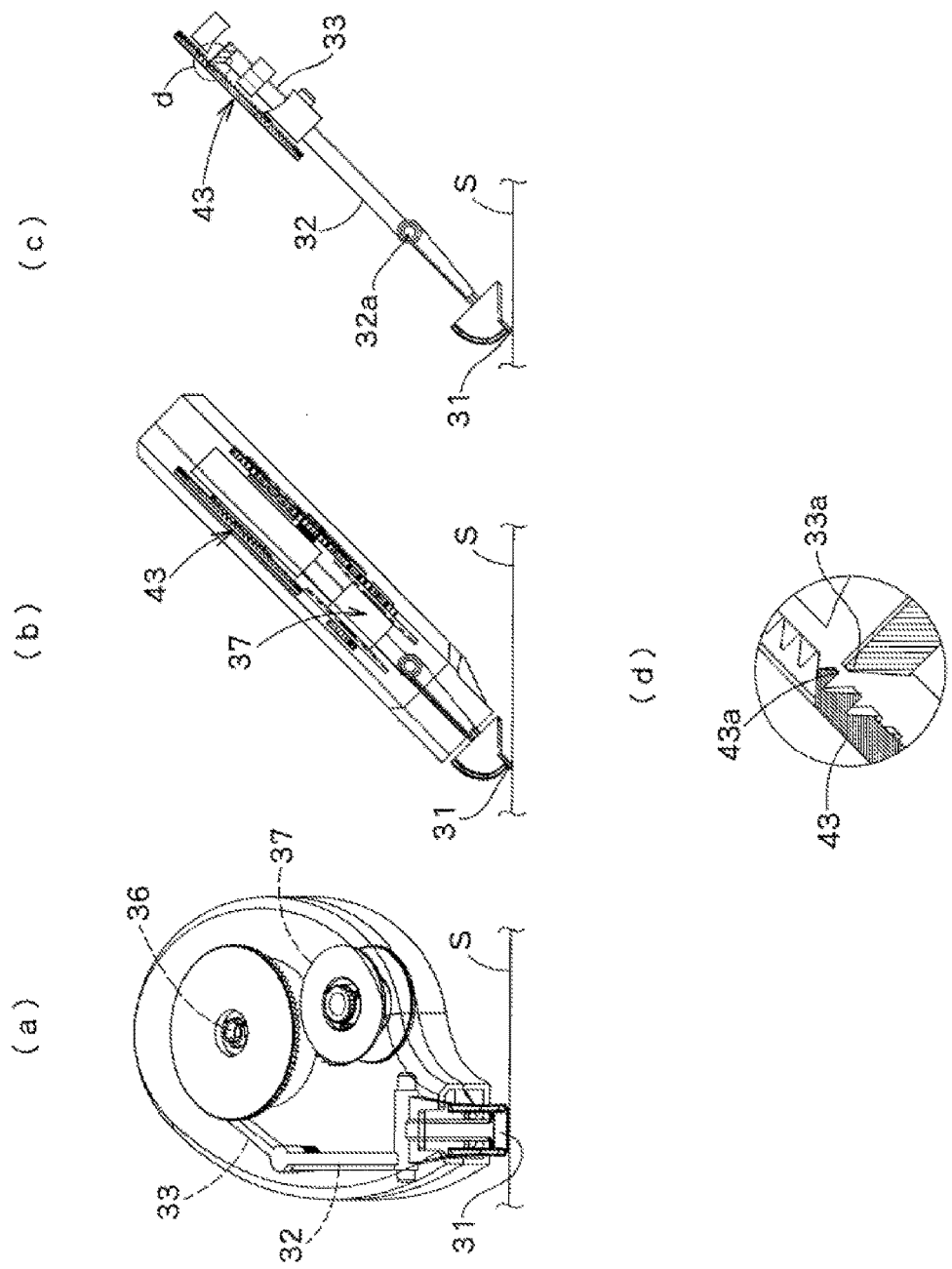

FIG. 15 illustrates a state wherein the horizontal-pull coating film transferring tool is in use, wherein (a) is a downward looking perspective diagram, (b) is a right side view of (a), (c) is a right side view with the case, the take-up reel, and the like, removed, and (d) is a partial enlarged view within the circle d in (c).

FIG. 16 is perspective diagrams illustrating a third embodiment of a horizontal-pull coating film transferring tool according to the present invention, wherein (a) is a downward looking perspective diagram and (b) is an upward looking perspective diagram.

Figure 17:
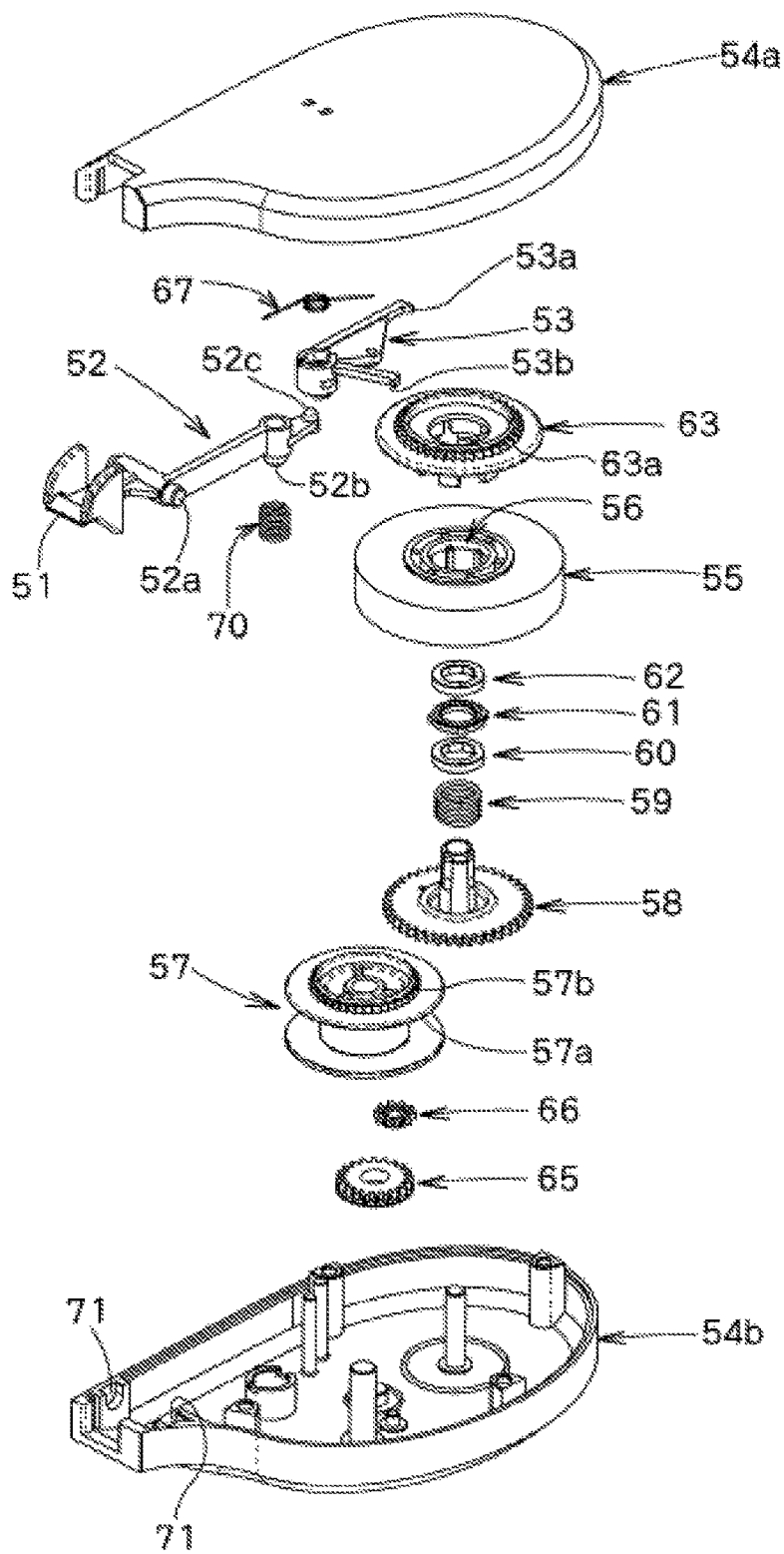

FIG. 17 is a downward looking perspective exploded view of the horizontal-pull coating film transferring tool illustrated in FIG. 16.

Figure 18:
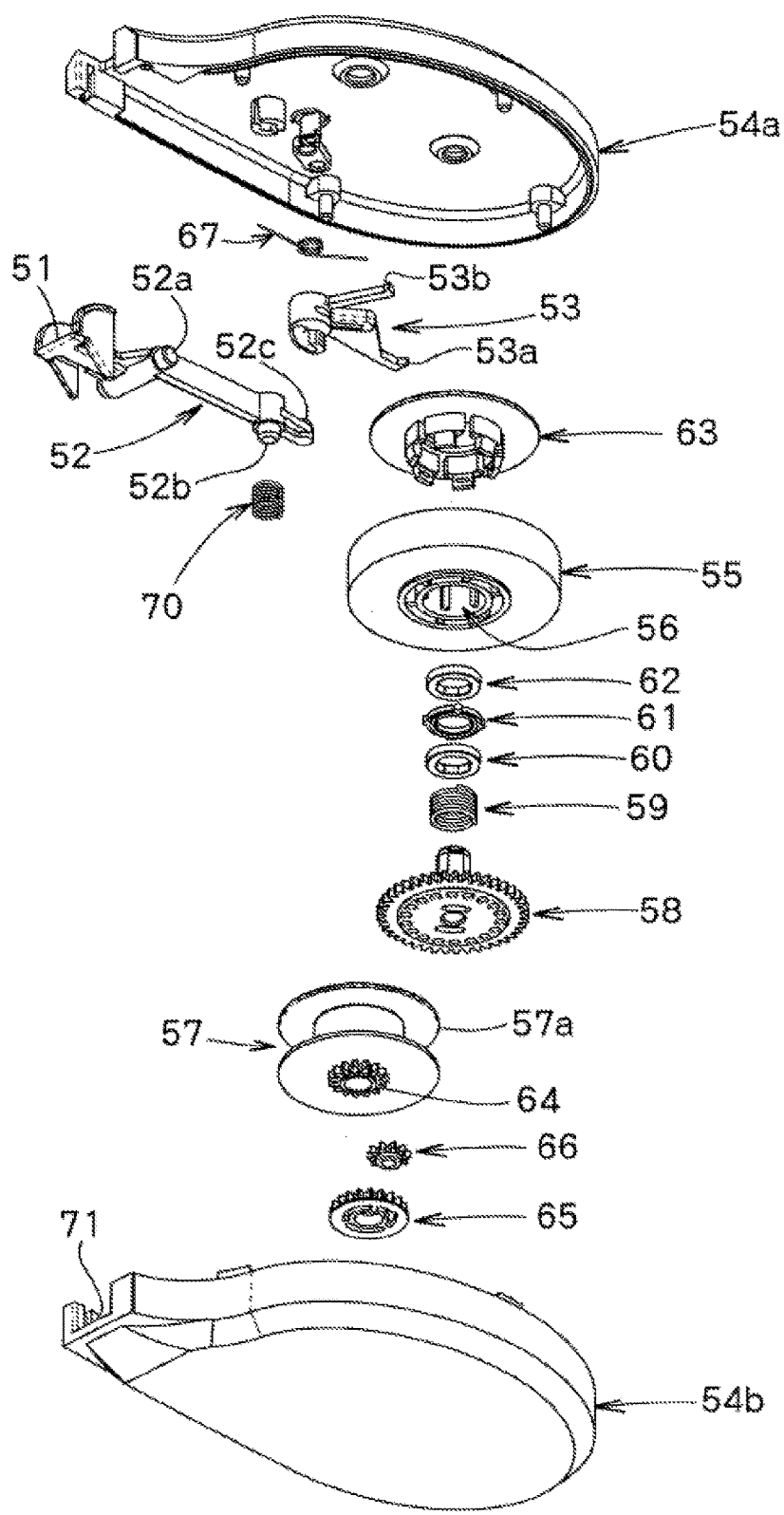

FIG. 18 is, similarly, an upward looking perspective exploded view of the horizontal-pull coating film transferring tool illustrated in FIG. 16.

FIG. 19 is upward looking perspective diagrams illustrating the assembly of the base member and the rotation locking member to the case, and the motion of the rotation locking member, wherein (a) shows the state when not in use and (b) shows the state when in use.

Figure 20:
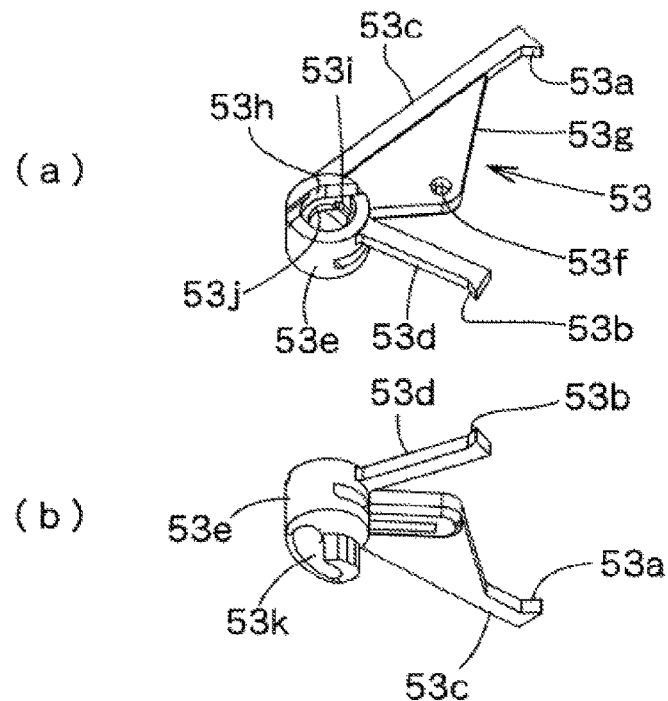

FIG. 20 is enlarged perspective diagrams of the rotation locking member, wherein (a) is a downward looking perspective diagram and (b) is an upward looking perspective diagram.

Figure 21:
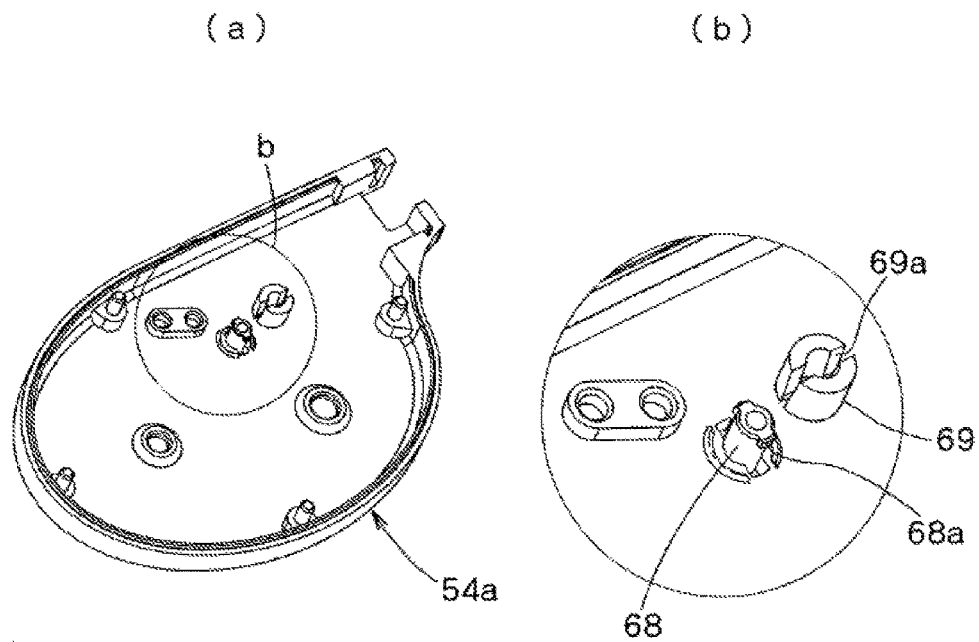

FIG. 21 is perspective diagrams of a top case member, wherein (a) is a downward looking perspective diagram wherein the top case member has been inverted, and (b) is a partial enlarged perspective diagram within the circle b in (a).

Figure 22:
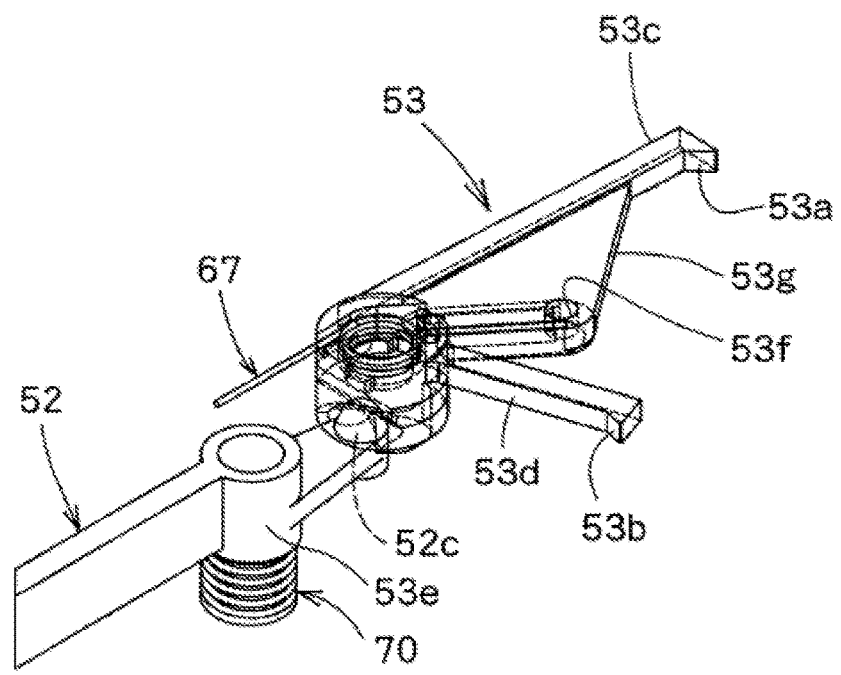

FIG. 22 is a partial enlarged downward looking perspective diagram illustrating the assembly of the base member and the rotation locking member.

Figure 23:
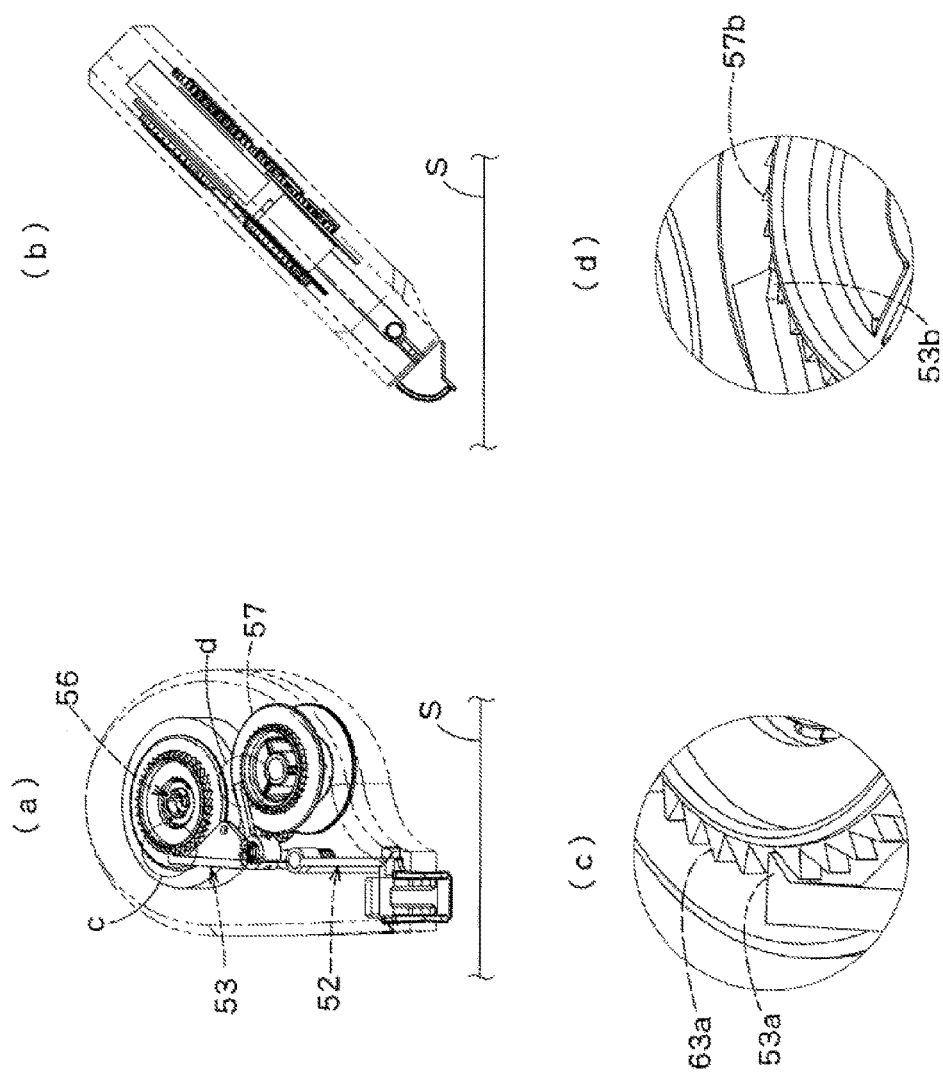

FIG. 23 illustrates a state wherein the horizontal-pull coating film transferring tool is not in use, wherein (a) is a downward looking perspective front view, (b) is a right side view of (a), (c) is a partial enlarged view within the circle c in (a), and (d) is a partial enlarged view within the circle d in (a).

Figure 24:
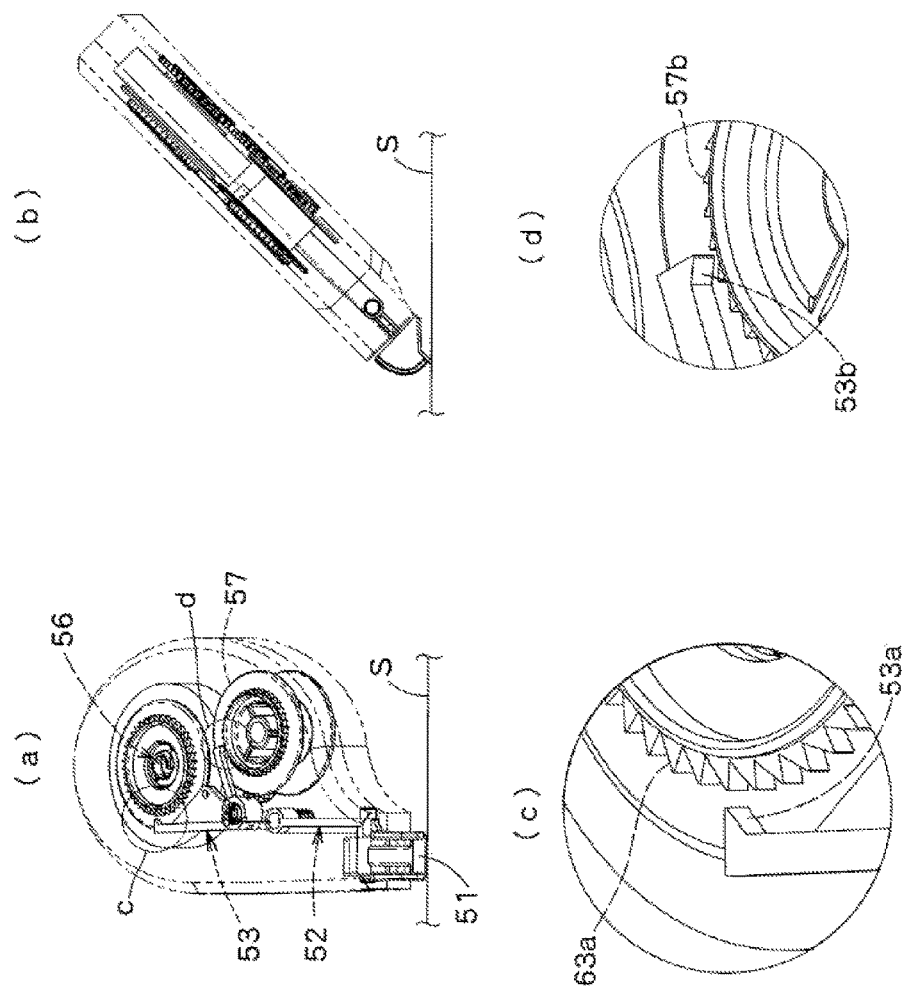

FIG. 24 illustrates a state wherein the horizontal-pull coating film transferring tool is in use, wherein (a) is a downward looking perspective front view, (b) is a right side view of (a), (c) is a partial enlarged view within the circle c in (a), and (d) is a partial enlarged view within the circle d in (a).

FIG. 25 is perspective diagrams illustrating a fourth embodiment of a horizontal-pull coating film transferring tool according to the present invention, wherein (a) is a perspective diagram of a state wherein the top case member 2a has been removed, and (b) is an upward looking perspective diagram of a state wherein the bottom case member 2b has been removed.

Figure 26:
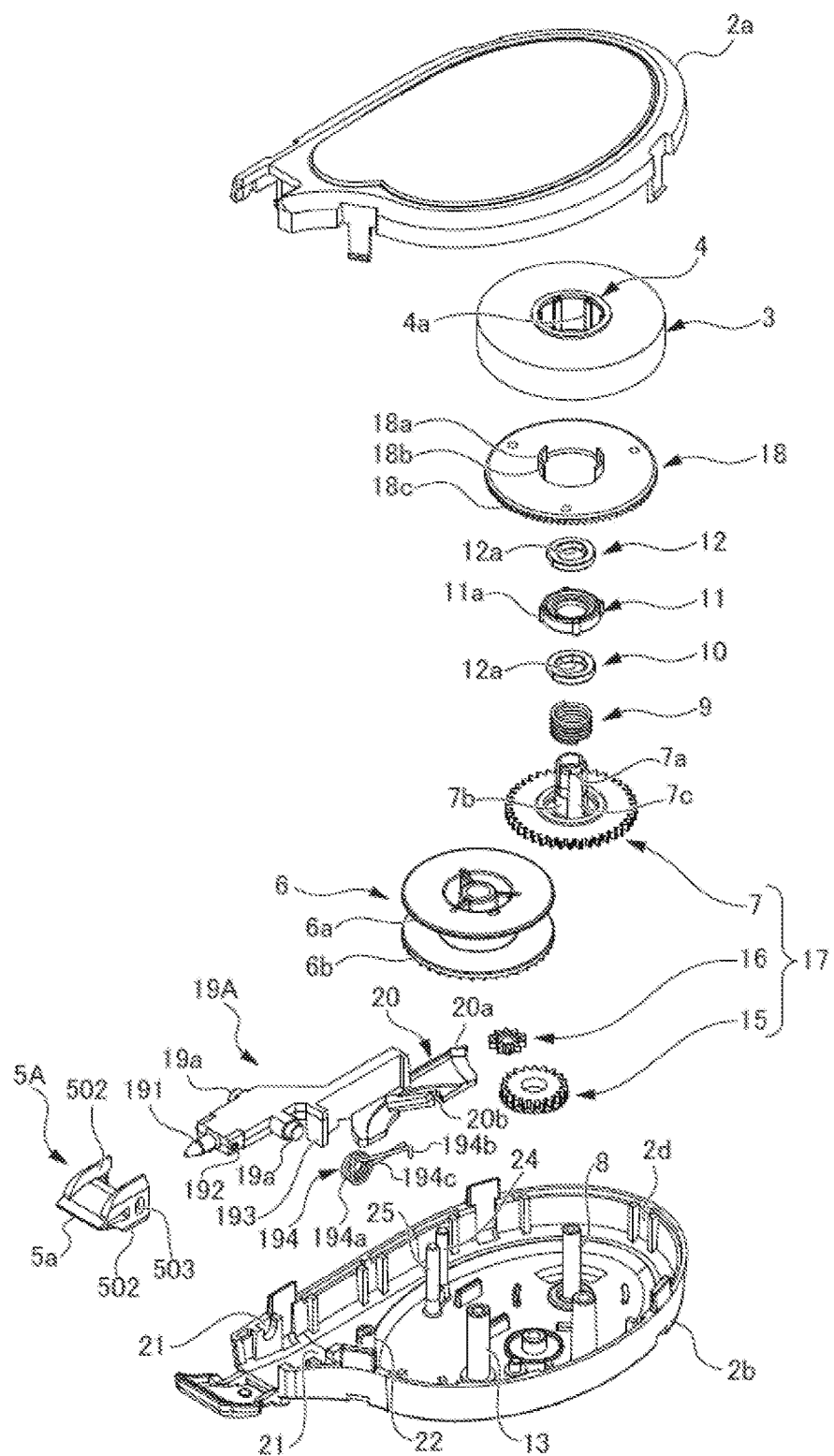

FIG. 26 is a perspective exploded view of the horizontal-pull coating film transferring tool that is illustrated in FIG. 25.

Figure 27:
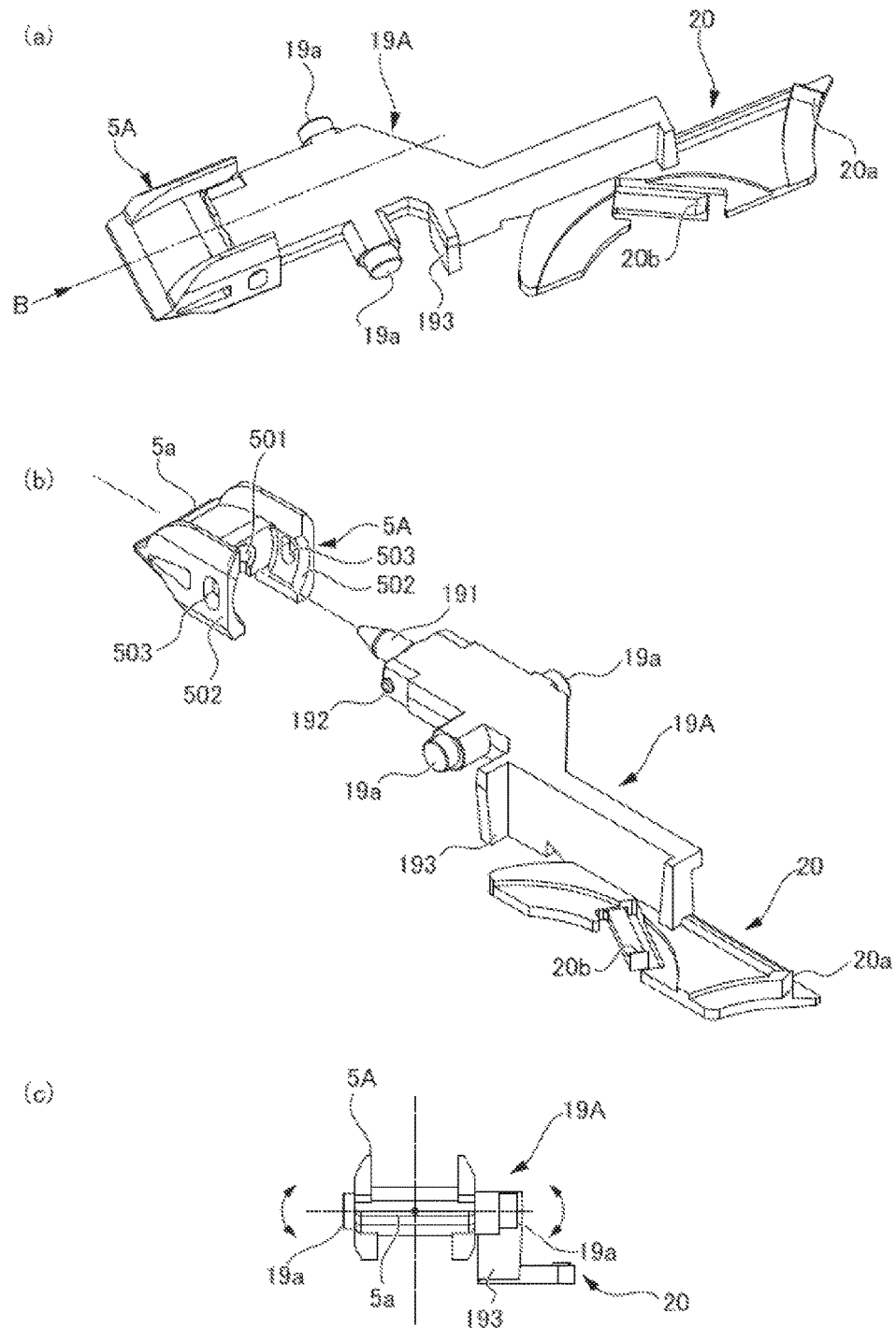

FIG. 27 is diagrams illustrating a base member wherein a transfer head is attached to the front end and a rotation locking member is disposed in the back half portion, wherein (a) is a perspective diagram, (b) is a perspective exploded view, and (c) is a view along the arrow B in (a).

Figure 28:
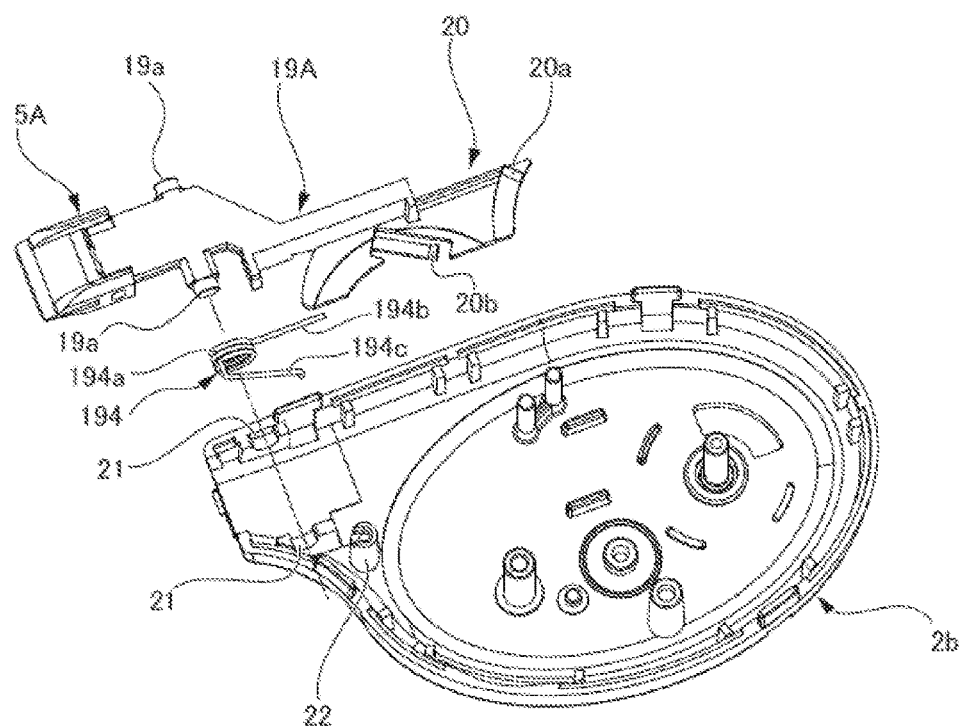

FIG. 28 is a perspective exploded view illustrating the base body to which the transfer head is attached, a spring, and a bottom case member 2*b*.

Figure 29:
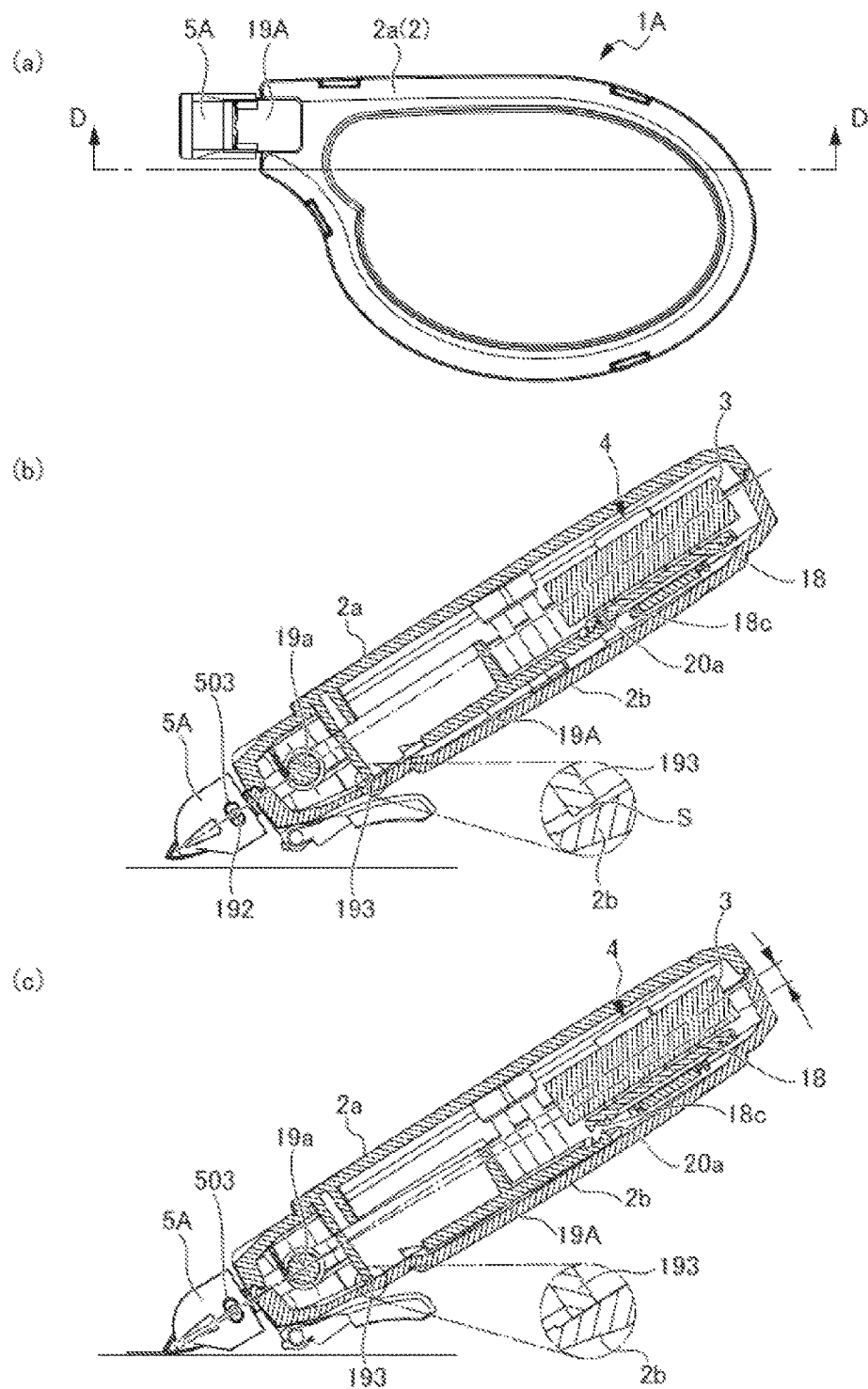

FIG. 29 is diagrams illustrating the state of the base body when not in use and when in use, wherein (a) is a plan view of the horizontal-pull coating film transferring tool, (b) is a cross-sectional view on the section D-D in (a) when not in use, and (c) is a cross-sectional view on the section D-D in (a) when in use.

Figure 30:
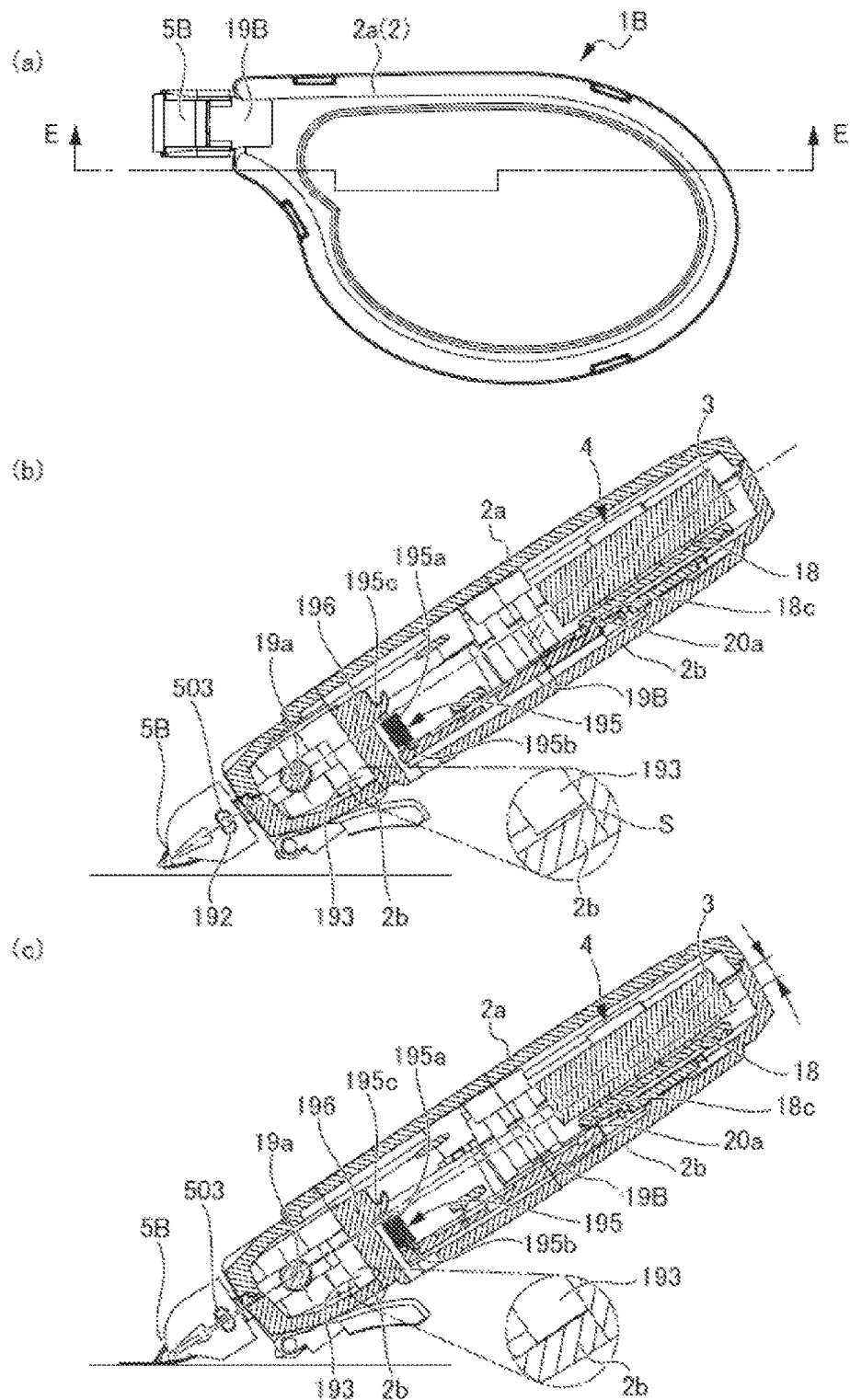

FIG. 30 is diagrams illustrating a fifth embodiment of a horizontal-pull coating film transferring tool according to the present invention, wherein (a) is a plan view of the horizontal-pull coating film transferring tool, (b) is a cross-sectional view along the section E-E in (a) when not in use, and (c) is a cross-sectional view along the section E-E in (a) when in use.

DETAILED DESCRIPTION

The present invention will be explained below based on various illustrative, non-exclusive embodiments. A first embodiment will be explained first.

Figure 2:
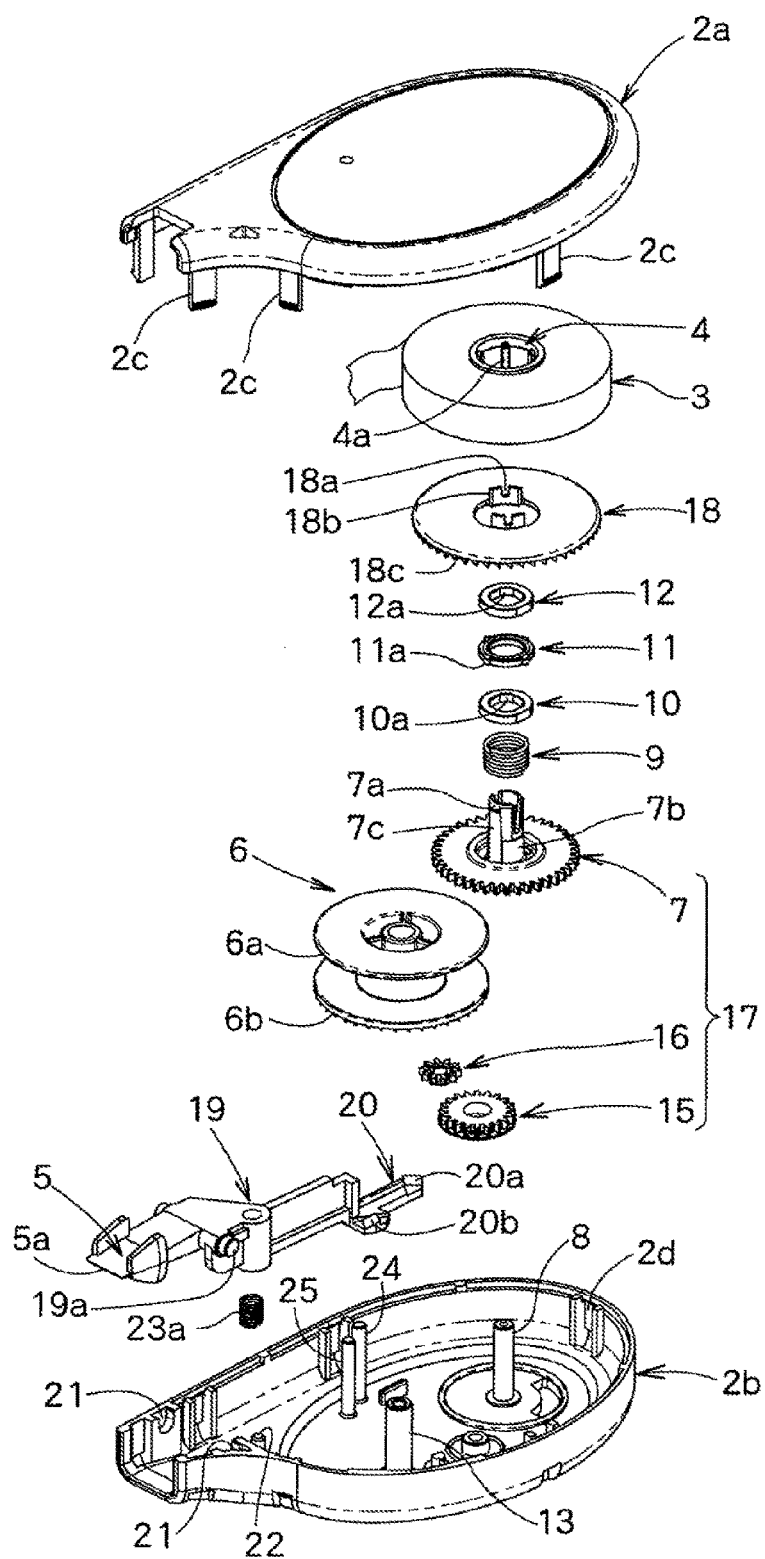
FIG. 2 is a downward looking perspective exploded view of the horizontal-pull coating film transferring tool illustrated in FIG. 1.
Figure 3:
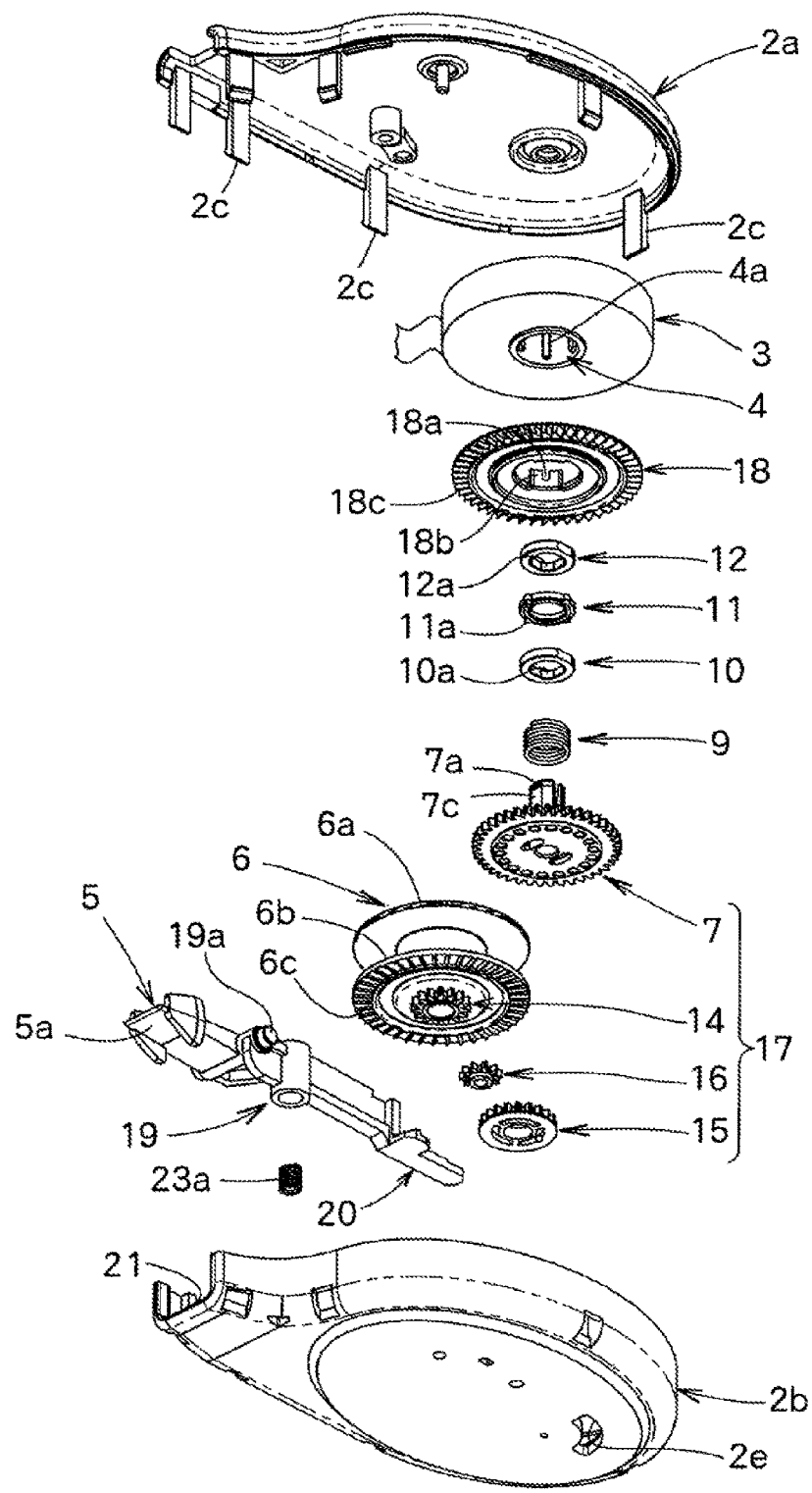
FIG. 3 is, similarly, an upward looking perspective exploded view of the horizontal-pull coating film transferring tool illustrated in FIG. 1.

FIG. 1 is perspective diagrams illustrating a first embodiment of a horizontal-pull coating film transferring tool according to the present invention, wherein (a) is a downward looking perspective diagram and (b) is an upward looking perspective diagram. FIG. 2 is a downward looking perspective exploded view of the horizontal-pull coating film transferring tool 1 illustrated in FIG. 1, and FIG. 3 is, similarly, an upward looking perspective exploded view of the horizontal-pull coating film transferring tool 1 illustrated in FIG. 1. Note that the transfer tape that is pressed against the transfer-destination surface by the transfer head is omitted in some of the drawings.

The horizontal-pull coating film transferring tool illustrated in FIG. 1 comprises: a supply reel 4 whereon is rolled a transfer tape 3, within a case 2 that is open on the front end, made from a pair of top and bottom case members 2*a* and 2*b*; a transfer head 5 that extends out from the supply reel 4, for transferring transfer tape 3 to a transfer-destination surface; a take-up reel 6 for rolling up the transfer tape 3 after transfer; and a power transmitting mechanism for causing the supply reel 4 and the take-up reel 6 to operate in coordination, as illustrated in FIG. 1 through FIG. 3. The pair of top and bottom case members 2*a* and 2*b* structure a case 2 through a small fitting piece 2*c* that extends from one of these, the case member 2*a*, being fitted into a recessed fitting portion 2*d* that is provided in the other, the case member 2*b*. Note that in the embodiments in this Specification, the case 2 is shown as being transparent.

The supply reel is borne, together with a supply reel gear 7, as described next, on a rotational supporting shaft 8 for the supply reel, which is provided protruding from the case member 2*b*. The supply reel gear 7 is provided with a cylindrical axle 7*b* that has, on an end portion, an engaging portion 7*a*, where, on this axle 7*b*, four members, namely a compression spring 9, a ring-shaped first spacer 10, a ring-shaped elastic stopper 11, and a ring-shaped second spacer 12, are fitted sequentially, and retained by the engaging portion 7*a*, after which the axle 7*b* of the supply reel gear 7 is fitted, so as to enable rotation, onto a rotation supporting shaft 8 for the supply reel, which protrudes into the case 2.

An engaging protrusion 11*a* is provided on the outer peripheral surface of the ring-shaped elastic stopper 11, where the elastic stopper rotates integrally with the supply reel 4 through the engaging protrusion 11*a* engaging with the aforementioned rib-shaped locking portion 4*a* of the supply reel 4.

Flat portions 7*c* are formed at four locations, which are essentially equally spaced, on the outer peripheral surface of the top half portion of the axle 7*b* of the supply reel gear 7, and inner holes 10*a* and 12*a* of the first spacer 10 and the second spacer 12 are, in the plan view, rectangular shapes wherein the corner portions are arc-shaped, enabling the first spacer 10 and the second spacer 12 to be fitted onto the axle 7*b* of the supply reel gear 7 so as to not be able to rotate, so that the supply real gear 7, the compression spring 9, the first spacer 10, and the second spacer 12 will rotate together integrally.

Because of this, the frictional force that is produced by the sliding surfaces between the first spacer 10 and the elastic stopper 11, the sliding surfaces between the elastic stopper 11 and the second spacer 12, and the sliding surfaces between the supply reel 4 and the supply reel gear 7 through the transfer tape 3 that is rolled onto the supply reel 4 being fed out through the transfer operation will produce a torque on the take-up reel 6 through the power transmitting mechanism.

Moreover, the take-up reel 6 is borne on a take-up reel rotation supporting shaft 13 that is provided protruding from the case member 2*b*.

As illustrated in FIG. 3, a take-up reel gear 14 is provided on the take-up reel 6. A first small gear 15 and a second small gear 16 are provided between the supply reel gear 7 and the take-up reel gear 14, where the supply reel gear 7 meshes with the first small gear 15, the first small gear 15 meshes with the second small gear 16, and the second small gear 16 meshes with the take-up reel gear 14. A torque is produced on the take-up reel 6 through cooperation between the take-up reel 6 and the supply reel 4, through the frictional force, through the power transmitting mechanism 17 made from the supply reel gear 7, the first small gear 15, the second small gear 16, and the take-up reel gear 14.

Moreover, a flange 18, for controlling the rotation of the supply reel 4, when the horizontal-pull coating film transferring tool 1 is and is not in use, is attached integrally with the supply reel 4. Engaging teeth 18*c* (referencing FIG. 3), described below, are provided on the peripheral edge of the flange 18.

Figure 4:
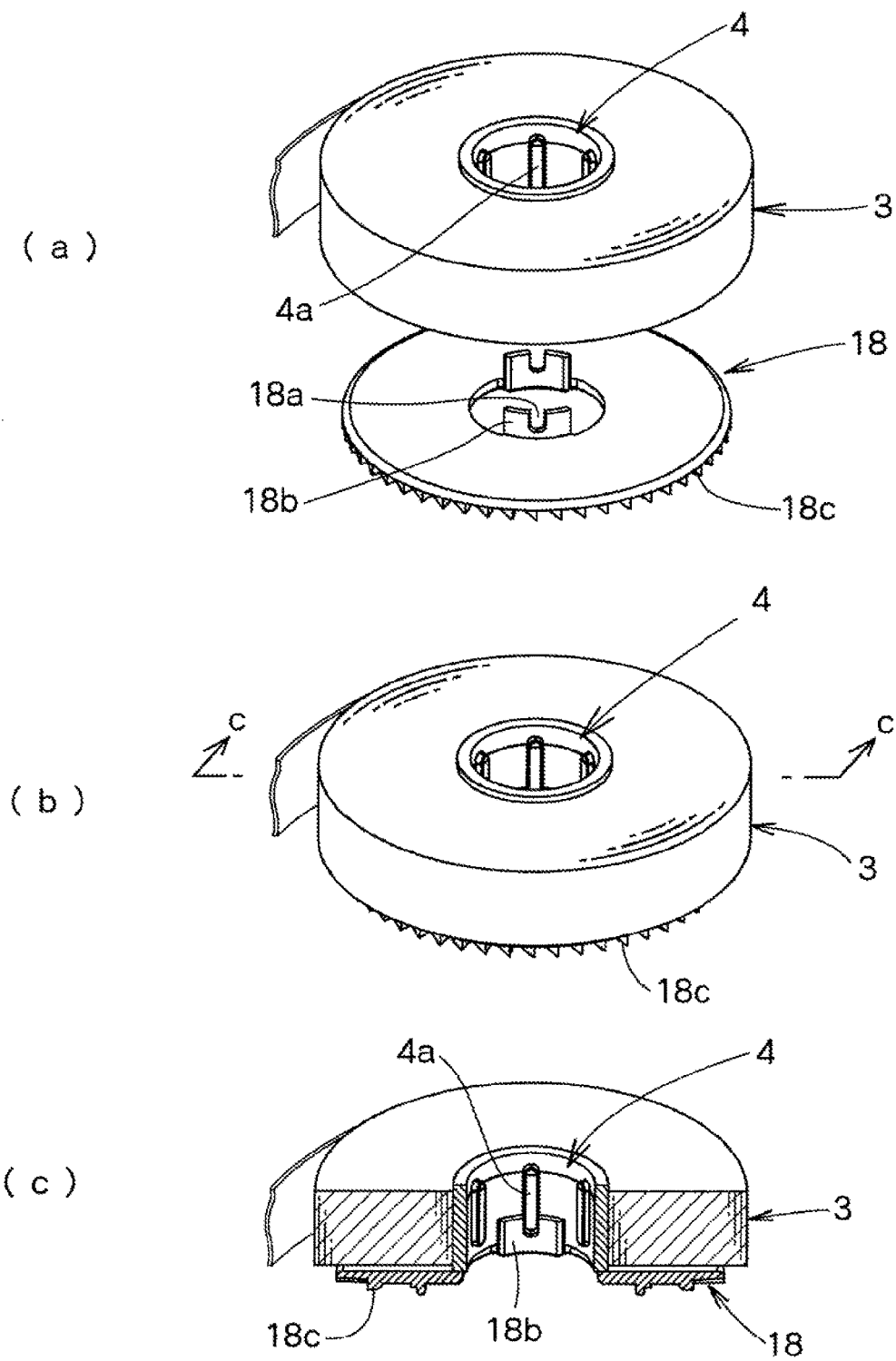
FIG. 4 is diagrams illustrating the form wherein the flange is assembled together with the supply reel, wherein (a) is a downward looking perspective diagram prior to assembly, (b) is a downward looking perspective diagram after assembly, and (c) is a lateral sectional perspective diagram of the section c-c in (b).

FIG. 4 is diagrams illustrating the form wherein the flange 18 is assembled together with the supply reel, wherein (a) is a downward looking perspective diagram prior to assembly, (b) is a downward looking perspective diagram after assembly, and (c) is a lateral sectional perspective diagram of the section c-c in (b). An attaching piece 18*b*, which has a notch 18*a*, is provided on the back face of the flange 18. The supply reel 4 and the flange 18 are assembled together, so as to rotate as a single unit, through causing the rib-shaped locking portion 4*a* of the supply reel 4 to engage with the notch 18*a* of the attaching piece 18*b*.

The horizontal-pull coating film transferring tool 1 according to the present invention is structured so that a base member having a transfer head 5 attached to the front end thereof, either integrally or replaceably in a cartridge system, and provided, in the back half portion thereof, with a rotation locking member 20 that has a supply reel engaging pawl 20a that can lock the rotation of the supply reel 4, provided either integrally with the base member 19 or so as to operate in coordination therewith, is supported, between the transfer head 5 and the rotation locking member 20, so as to be able to rotate, on a base member pivoting supporting portion 21 that is provided at a prescribed position within the case 2, and additionally, an elastic return mechanism 23 is interposed between the base member 19 and the case 2, so that the rotational lock of the supply reel 4 is released by rotation of the base member 19 when the transfer head 5 is pressed against the transfer-destination surface S, and rotation of the supply reel 4 is locked through the base member 19 being returned to the original position by the elastic return mechanism 23 when the pressing of the transfer head 5 is released, where the direction of the pressing edge portion 5a of the front end in the transfer head 5, for pressing the transfer tape 3 against the transfer-destination surface S, is provided substantially perpendicularly to the rotation supporting shafts 8 and 13 of the supply reel 4 and the take-up reel 6.

Note that in this Specification, the "locking" of the rotation of the supply reel refers to locking of the rotation in at least the direction in which the transfer tape, which is rolled onto the supply reel, is pulled out, where the "locking" of the rotation of the take-up reel refers to locking of rotation in at least the direction that is opposite of the direction wherein the transfer tape is rolled up.

The explanation will progress sequentially below.

FIG. 5 is diagrams illustrating a base member 19 with a transfer head 5 attached to the front end thereof and a rotation locking member 20 disposed in the back half portion thereof, wherein (a) is a downward looking perspective diagram, (b) is a plan view, (c) is a partial enlarged view within the circle c in (a), and (d) and (e) are lateral sectional views of sections d-d and e-e, respectively, in (b). As illustrated in FIGS. 5 (a) and (b), the transfer head 5 is attached to the front end of the base member 19, and the rotation locking member 20 is disposed on the back half portion thereof.

The attachment of the transfer head 5 to the front end of the base member 19, in the present embodiment, is through attaching integrally; however, the attachment may instead be replaceable, through a cartridge system. Moreover, while the arrangement of the rotation locking member 20 in the back half portion of the base member 19 is, in the present invention, arranged integrally, the arrangement may instead be in a form wherein there is motion that is coordinated with the base member 19, as illustrated in the third embodiment, set forth below.

As illustrated in FIGS. 5(c) through (e), in the rotation locking member 20, a supply reel engaging pawl 20a, which can lock the rotation of the supply reel 4, is provided toward the back, and a take-up reel engaging pawl 20b, described below, which can lock the rotation of the take-up reel 6, is provided toward the front.

Moreover, a crosswise supporting shaft 19a for supporting the base member 19 rotatably is provided on the base member pivoting supporting portion 21 that is provided on the case 2, at a lengthwise center portion of the base member 19.

Moreover, behind the supporting shaft 19a, a hole portion 19b (referencing FIG. 6), which is closed on one end, is open downward, in the vertical direction, for fitting onto a compression spring pin 22 that is provided protruding from the case member 2b, as described below, and for fitting onto a compression spring 23a, as the elastic return mechanism 23.

FIG. 6 illustrates the form wherein the base member 19, having the transfer head 5 attached to the front end thereof and the rotation locking member 20 arranged in the back half portion thereof, is supported rotatably on the base member pivoting supporting portion 21 that is provided in the case 2.

FIG. 7 illustrates a state when not in use, wherein (a) is the horizontal-pull coating film transferring tool, illustrated by the dotted lines, and (b), (c), (d), and (e), respectively, are a lateral sectional view of the section b-b, a lateral sectional view of the section c-c, a lateral sectional view of the section d-d, and a lateral sectional view of the section e-e. FIG. 8 illustrates a state wherein the horizontal-pull coating film transferring tool is in use, wherein (a) is the horizontal-pull coating film transferring tool, illustrated by the dotted lines, and (b), (c), (d), and (e), respectively, are a lateral sectional view of the section b-b, a lateral sectional view of the section c-c, a lateral sectional view of the section d-d, and a lateral sectional view of the section e-e. FIG. 9 illustrates a state wherein the horizontal-pull coating film transferring tool is not in use, wherein (a) is a downward looking perspective front view, (b) is a right side view of (a), (c) is a right side view with the case removed, (d) is a partial enlarged view within the circle d in (c), and (e) is a partial enlarged view within the circle e in (c). FIG. 10 illustrates a state wherein the horizontal-pull coating film transferring tool is in use, wherein (a) is a downward looking perspective front view, (b) is a right side view of (a), (c) is a right side view with the case removed, (d) is a partial enlarged view within the circle d in (c), and (e) is a partial enlarged view within the circle e in (c).

As illustrated in FIG. 6, FIG. 7(b), and FIG. 8(b), the supporting shaft 19a of the base member 19 is supported on the base member pivoting supporting portion 21 of the case member 2b, to enable the base member 19 to rotate.

Moreover, as illustrated in FIG. 6, FIG. 7(c), and FIG. 8(c), the compression spring 23a is fitted onto the compression spring pin 22 that is provided standing in the case member 2b, and the compression spring pin 22 and the compression spring 23a are fitted into the hole portion 19b of the base member 19. In this compression spring 23a, the bottom end contacts the bottom face of the case member 2b and the top end contacts the top face 19c of the hole portion 19b, and operates so as to apply a biasing force so as to rotate the base member 19 in the counterclockwise direction in FIG. 6.

On the other hand, as illustrated in FIG. 3, engaging teeth 18c for meshing with the supply reel engaging pawl 20a of the rotation locking member 20 are provided on the peripheral edge of the flange 18 that rotates integrally with the supply reel 4, and engaging teeth 6c for meshing with the take-up reel engaging pawl 20b of the rotation locking member 20 are provided on the peripheral edge of the flange 6b, which is one of the two flanges 6a and 6b that are on the left and the right of the take-up reel 6.

When not in use, as illustrated in FIGS. 7 (a), (d), and (e), the supply reel engaging pawl 20a and the take-up reel engaging pawl 20b of the rotation locking member 20 are, respectively, engaged with an engaging tooth 18a of the flange 18 that is integrated with the supply reel 4, and an engaging tooth 6c of the flange 6b of the take-up reel 6, by the biasing force of the compression spring 23a, to lock the rotation of the supply reel 4 and of the take-up reel 6.

On the other hand, at the time of use, as illustrated in FIGS. 8 (a), (d), and (e), the transfer head 5 is pressed against the transfer-destination surface S, and, through the pressure thereof, the base member 19 is rotated, and the rotation locking member 20, which is provided integrally with the base member 19, is also rotated, so that the supply reel engaging pawl 20a and the take-up reel engaging pawl 20b that are provided in the rotation locking member 20 disengage from the engaging teeth 18a and 6c, to enable the supply reel 4 and the take-up reel 6 to rotate.

In one or more embodiments of the present invention, at the commencement of use, the structure is such that the engagement of the take-up reel engaging pawl 20b with the engaging tooth 6c of the flange 6b of the take-up reel 6 is released prior to the engagement of the supply reel engaging pawl 20a and the engaging tooth 18a of the flange 18 of the supply reel 4, to release the rotational lock of the take-up reel 6. With such a structure, the shape of the engaging teeth 6c of the flange 6b of the take-up reel 6 forms a ratchet shape to enable rotation in the direction of rolling and to prevent rotation in the opposite direction, even when taking up slack when not in use, so that in a state wherein the engagement between the supply reel engaging pawl 20a and the engaging tooth 18a of the flange 18 of the supply reel 4 is not released, it is possible to take up any slack in the transfer tape 3 through being able to rotate the take-up reel 6 with the rotation of the supply reel 4 still in the stopped state, through rotating the supply reel gear 7 through an opening window 2e (referencing FIG. 3) that is provided in the case member 2b.

Moreover, after use, the base member 19 may be returned to the original position by the compression spring 23a, to lock the rotation of the supply reel 4 and of the take-up reel 6, accompanying the removal of the pressure of the transfer head 5 against the transfer-destination surface S after use.

The use of such a structure can reduce the likelihood of the occurrence of the so-called "stringing" phenomenon when the transfer has been completed, even if the torques on the supply reel 4 and the take-up reel 6 are set so as to be small, because the rotation of the supply reel 4 is locked where not in use, without setting the torques of the supply reel 4 and of the take-up reel 6 so as to be large. The result is the ability to produce a horizontal-pull coating film transferring tool 1 that has a light feel in use.

Moreover, in the base member 19, the back end portion (the rotation locking member 20) is always biased toward the top by the compression spring 23a, so that the rotation of the supply reel 4 will be locked when not in use. However, when in use, when the bottom face of the transfer head 5 is pressed against the transfer-destination surface, the base member 19 will move with a seesaw action, so that the back end portion will move away from the supply reel 4, to release the rotational lock of the supply reel 4, so that the transfer of the coating film will be carried out smoothly. Following this, when the transfer of the coating film has been completed, and the transfer head 5 is removed from the transfer-destination surface, in the base member 19 the back end is always pressed upward by the compression spring 23a, and thus the movement of the supply reel 4 will be locked by the rotation locking member 20 that is disposed on the back end side of the base member 19, locking the rotation of the supply reel 4. Through this, when the coating film is severed through removal of the horizontal-pull coating film transferring tool 1 from the transfer-destination surface after the completion of the transfer of the coating film, rotation of the supply reel 4, through the coating film being pulled out toward the front by the force for severing the rotation film, is prevented. This enables the coating film to be severed cleanly.

Moreover, a feature is that the rotation supporting shaft 8 of the supply reel 4 and the rotation supporting shaft 13 of the take-up reel 6 are substantially perpendicular to the direction of the pressing edge portion 5a of the front end in the transfer head 5, for pressing the transfer tape 3 against the transfer-destination surface S. This enables the provision of a horizontal-pull coating film transferring tool 1 with good ease of use.

Moreover, a first guide pin 24, for guiding, to the transfer head 5, the transfer tape 3 that is pulled off of the supply reel 4, and a second guide pin 25, for guiding, to the take-up reel 6, the transfer tape 3 after transferring from the transfer head 5, are provided in the case member 2b.

Moreover, in order to smoothen the respective engagement and disengagement of the supply reel engaging pawl 20a and the take-up reel engaging pawl 20b with the engaging teeth 18a and the engaging teeth 6c, the supply reel engaging pawl 20a and the take-up reel engaging pawl 20b are provided so as to protrude at a direction that is substantially perpendicular relative to the direction of the pressing edge portion 5a of the transfer head 5.

Moreover, as illustrated in FIG. 1(a), FIG. 5(b), FIG. 9(a), and FIG. 10(a), the base member 19 is disposed in a space between the lengthwise-direction axis 5b of the transfer head 5 and the rotation supporting shaft of the take-up reel 6. Disposing the base member 19 in this way enables the provision of a horizontal-pull coating film transferring tool 1 having a compact case 2, through enabling containment within the case 2 without wasteful use of space.

A second embodiment will be explained next.

FIG. 11 is perspective diagram of a horizontal-pull coating film transferring tool 30 according to a second embodiment of the present invention, wherein (a) is a downward looking perspective diagram and (b) is an upward looking perspective diagram. FIG. 12 is a downward looking perspective exploded view of the horizontal-pull coating film transferring tool 30 illustrated in FIG. 11, and FIG. 13 is an upward looking exploded perspective diagram.

When compared with the horizontal-pull coating film transferring tool 1 according to the first embodiment, the horizontal-pull coating film transferring tool 30 according to the second embodiment is different only in the specific structures of the transfer head 31, the base member 32, and the rotation locking member 33, which are structured integrally, where the remainder is fundamentally identical to the horizontal-pull coating film transferring tool 1 according to the first embodiment. That is, as with the horizontal-pull coating film transferring tool 1 according to the first embodiment, within a case 34 made from a pair of case members 34a and 34b, a supply reel 36 onto which a transfer tape 35 is rolled, a take-up reel 37, a supply reel gear 38, a compression spring 39, a first spacer 40, an elastic stopper 41, a second spacer 42, a flange 43, a take-up reel gear 44, a first small gear 45, and a second small gear 46 are assembled together.

In the same manner as in the first embodiment, the transfer head 31, the base member 32, and the rotation locking member 33 are structured into a single unit. As illustrated in FIG. 12 and FIG. 13, a supply reel engaging pawl 33a is provided on the rotation locking member 33, but no take-up reel engaging pawl is provided.

Moreover, while in the first embodiment the base member 19 was disposed in a space between the lengthwise-direction axis 5b of the transfer head 5 and the rotation supporting shaft of the take-up reel 6, in the second embodiment the case is somewhat larger because this structure is not used.

FIG. 14 illustrates a state wherein the horizontal-pull coating film transferring tool 30 is not in use, wherein (a) is a downward looking perspective diagram, (b) is a right side view of (a), (c) is a right side view with the case, the take-up reel removed, and (d) is a partial enlarged view within the circle d in (c).

FIG. 15 illustrates a state wherein the horizontal-pull coating film transferring tool 30 is in use, wherein (a) is a downward looking perspective diagram, (b) is a right side view of (a), (c) is a right side view with the case, the take-up reel removed, and (d) is a partial enlarged view within the circle d in (c).

While, when not in use, as illustrated in FIG. 14, the supply reel engaging pawl 33a engages an engaging tooth 43a of the flange 43, when in use the base member 32 is rotated around the supporting shaft 32a through the transfer head 31 being pressed against the transfer-destination surface S, releasing the engagement between the supply reel engaging pawl 33a and of the engaging tooth 43a of the flange 43, to enable the transfer tape 35 to be pulled off of the supply reel 36.

Moreover, the base member 32 is returned to the original position by the compression spring 47, locking the rotation of the supply reel 36, accompanying the removal of the pressure of the transfer head 31 against the transfer-destination surface after use.

A third embodiment will be explained next.

FIG. 16 is perspective diagram of a horizontal-pull coating film transferring tool 50 according to a third embodiment of the present invention, wherein (a) is a downward looking perspective diagram and (b) is an upward looking perspective diagram. FIG. 17 is a downward looking perspective exploded view of the horizontal-pull coating film transferring tool 50 illustrated in FIG. 16, and FIG. 18 is an upward looking exploded perspective diagram.

When compared with the horizontal-pull coating film transferring tool 1 according to the first embodiment, the horizontal-pull coating film transferring tool 50 according to the third embodiment is different only in the specific structures for, for example, the assembly of the transfer head 51, the base member 52, and the rotation locking member 53, where the remainder is fundamentally identical to the horizontal-pull coating film transferring tool 1 according to the first embodiment.

That is, as with the horizontal-pull coating film transferring tool 1 according to the first embodiment, within a case 54 made from a pair of case members 54a and 54b, a supply reel 56 onto which a transfer tape 55 is rolled, a take-up reel 57, a supply reel gear 58, a compression spring 59, a first spacer 60, an elastic stopper 61, a second spacer 62, a flange 63, a take-up reel gear 64, a first small gear 65, and a second small gear 66 are assembled together.

While the transfer head 51 and the base member 52 are structured integrally, in the same manner as in the first embodiment, the rotation locking member 53 is disposed in the back half portion of the base member 52, so as to operate in coordination with the base member 52.

FIG. 19 is upward looking perspective diagrams illustrating the assembly of the base member 52 and the rotation locking member 53 to the case 54, and the motion of the rotation locking member 53, wherein (a) shows the state when not in use and (b) shows the state when in use. FIG. 20 is enlarged perspective diagrams of the rotation locking member 53, wherein (a) is a downward looking perspective diagram and (b) is an upward looking perspective diagram. FIG. 21 is perspective diagrams of a top case member 54a, wherein (a) is a downward looking perspective diagram wherein the top case member 54a has been inverted, and (b) is a partial enlarged perspective diagram within the circle b in (a). FIG. 22 is a partial enlarged downward looking perspective diagram illustrating the assembly of the base member 52 and the rotation locking member 53.

As illustrated in FIG. 20, in the rotation locking member 53, a supply reel engaging pawl arm 53c that is provided with a supply reel engaging pawl 53a, and a take-up reel engaging pawl arm 53d that is provided with a take-up reel engaging pawl 53b, are provided in branched shapes, where the base portions of both are connected by a shaft cylinder 53e. As illustrated in FIG. 20(a), a triangular torsion spring securing plate 53g, wherein is provided in an engaging hole 53f for engaging one end of a torsion spring 67, is formed integrally with the supply reel engaging pawl arm 53c.

An axle hole 53h for securing a rotation locking member 53 to the top case member 54a so as to enable rotation is provided toward the top of the shaft cylinder 53e. A reduced diameter portion 53j, having a partial cutaway 53i at the center portion in the vertical direction, is provided in the axle hole 53h.

As illustrated in FIG. 20(b), a rising slope curved groove 53k is provided toward the bottom of the shaft cylinder 53e.

On the other hand, as illustrated in FIG. 21, a rotation locking member supporting shaft 68, and a spring engaging portion 69 for engaging one end of the torsion spring 67, are each provided protruding from the inner surface of the top case member 54a. An engaging piece 68a is provided on the top end of the rotation locking member supporting shaft 68.

The bearing of the rotation locking member 53 on the rotation locking member supporting shaft 68 is as follows. The rotation locking member supporting shaft 68 is fitted into the axle hole 53h of the shaft cylinder 53e in the rotation locking member 53 in a state wherein the engaging piece 68a of the rotation locking member supporting shaft 68 is aligned with the cutaway 53i within the axle hole 53h, so that after an engaging piece 68a has passed through the reduced diameter portion 53j within the axle hole 53h, the rotation locking member 53 is borne on the rotation locking member supporting shaft 68, so as to be able to rotate, and is retained by the engaging piece 68a.

Moreover, one end of the torsion spring 67 is engaged in the engaging hole 53f of the torsion spring securing plate 53g in the rotation locking member 53, and the other end of the torsion spring 67 is engaged in the notch groove 69a of the spring engaging portion 69 of the top case member 54a. Through this, the rotation locking member 53 is assembled so that the supply reel engaging pawl 53a and the take-up reel engaging pawl 53b are biased in the direction of releasing the engaging tooth 63a of the flange 63 that rotates together with the supply reel 56, and releasing the engaging tooth 57b of the flange 57a of the take-up reel 57, respectively.

On the other hand, a spring securing protrusion 52b, for securing the top end of a compression spring 70, is provided in the center back portion of the base member 52 (referencing FIG. 18 and FIG. 22), where the top end of the compression spring 70 is secured to the securing protrusion 52b, and the bottom end makes contact with the inner surface of the bottom case member 54b. Moreover, the supporting shaft 52a of the base member 52 is pivotally supported so as to enable rotation of the bottom case member 54b on the base member pivoting supporting portion 71.

Moreover, the linkage between the base member 52 and the rotation locking member 53 is as follows.

A hemispherical engaging portion 52c (referencing FIG. 17 and FIG. 22) is provided toward the top on the back end of the base member 52, where this engaging portion 52c contacts the curved groove 53k of the shaft cylinder 53e in the rotation locking member 53.

Moreover, as described above, the torsion spring 67 applies a biasing force in the direction in which the supply reel engaging pawl 53a and the take-up reel engaging pawl 53b release the engagement with the engaging tooth 63a and the engaging tooth 57b, respectively, that are engaged therewith; however, because the compression spring 70 applies biasing with a force that is stronger than that of the torsion spring 67, when not in use the state will be one wherein the supply reel engaging pawl 53a and the take-up reel engaging pawl 53b will be engaged with an engaging tooth 63a and an engaging tooth 57b, respectively, as illustrated in FIG. 19(a).

On the other hand, as illustrated in FIG. 19(b), when in use the pressure of the transfer head 51 against the transfer-destination surface S will be greater than the biasing force of the compression spring 70, and thus the supply reel engaging pawl 53a and the take-up reel engaging pawl 53b will be released from engagement with the engaging tooth 63a and the engaging tooth 57b, respectively, through the effect of the biasing force of the torsion spring 67, enabling rotation of the supply reel 56 and of the take-up reel 57.

FIG. 23 illustrates a state wherein the horizontal-pull coating film transferring tool is not in use, wherein (a) is a downward looking perspective front view, (b) is a right side view of (a), (c) is a partial enlarged view within the circle c in (a), and (d) is a partial enlarged view within the circle d in (a). FIG. 24 illustrates a state wherein the horizontal-pull coating film transferring tool is in use, wherein (a) is a downward looking perspective front view, (b) is a right side view of (a), (c) is a partial enlarged view within the circle c in (a), and (d) is a partial enlarged view within the circle d in (a).

When not in use, the state will be one wherein the supply reel engaging pawl 53a and the take-up reel engaging pawl 53b will be engaged with an engaging tooth 63a and an engaging tooth 57b, respectively, as illustrated in FIG. 23.

On the other hand, when in use this engaged state will be released, as illustrated in FIG. 24.

Moreover, after use, the base member 52 and the rotation locking member 53 will be returned to their original positions, by the compression spring 70, to produce the engaged state again, accompanying the removal of the pressure of the transfer head 51 from the transfer-destination surface S after use.

A fourth embodiment of a horizontal-pull coating film transferring tool according to the present invention will be explained next in reference to FIG. 25 through FIG. 29. Note that in the explanations in the fourth embodiment and beyond, identical reference symbols are assigned to structures that are identical to those in the first embodiment, and explanations thereof will be omitted or abbreviated.

The horizontal-pull coating film transferring tool 1A according to the fourth embodiment, as illustrated in FIG. 25 and FIG. 26, has a structure that is identical to that of the first embodiment except for differences, from the horizontal-pull coating film transferring tool 1 according to the first embodiment, in the structures of, for example, the transfer head 5A, the base member 19A, the rotation locking member 20, and the elastic return mechanism 194.

In the fourth embodiment, the base member 19A and the transfer head 5A are structured from separate members. Given this, the transfer head 5A is attached to a base member 19A that is able to rotate around a shaft that extends in the lengthwise direction of the transfer head 5A.

More specifically, in the fourth embodiment, a first protruding portion 191 that protrudes towards the front is formed on a tip end portion of the base member 19A, as illustrated in FIG. 27(b). Moreover, a pair of second protruding portions 192 that protrude in the direction that is perpendicular to the direction of extension of the first protruding portion 191 (that is, in the crosswise direction) is formed on the respective side faces of the tip end side of the base member 19A.

Moreover, a first hole portion 501, for insertion of the first protruding portion 191, is formed on the back end face of the transfer head 5A. Furthermore, the transfer head 5A is provided with a pair of sidewall portions 502 that extend further to the rear of the back end face from the side portions of the transfer head 5A, where elongated holes 503 that are long in the vertical direction (the direction that is perpendicular to the transfer surface of the transfer head 5A) are formed in the pair of sidewall portions 502. In a state wherein the first protruding portion 191 of the base member 19A is inserted into the first hole portion 501, the pair of sidewall portions 502 will cover the side faces of the base member 19A at the tip end thereof. Given this, in this state the second protruding portions 192 of the base member 19A are inserted into the elongated holes 503, to thereby connect to the transfer head 5A to the base member 19A.

Here the vertical-direction length of the elongated holes 503 is set so as to be longer than the diameter of the second protruding portions 192. Through this, as illustrated in FIG. 27(c), the transfer head 5A that is connected to the tip end of the base member 19A, will be able to rotate around the first protruding portion 191 that is inserted into the first hole portion 501. Moreover, the transfer head 5A will be able to rotate in a range wherein the second protruding portions 192 can move within the elongated holes 503. That is, the range of rotation of the transfer head 5A is determined by the vertical-direction length of the elongated holes 503. In other words, the range of rotation of the transfer head 5A is limited by the elongated holes 503.

Moreover, in the fourth embodiment, the base member 19A is biased, by a torsion coil spring 194, in the direction wherein the rotation locking member 20 will block the rotation of the supply reel 4. More specifically, as illustrated in FIG. 28, the torsion coil spring 194 comprises a coil portion 194a, a first spring portion 194b that extends from one end side of the coil portion 194a, and a second spring portion 194c that extends from the other end side of the coil portion 194a. Additionally, in the torsion coil spring 194, the coil portion 194a is fitted onto the supporting shaft 19a of the base member 19A, and, additionally, the first spring portion 194b is secured to the bottom face side of the base member 19A and the second spring portion 194c is secured to the inner surface of the bottom case member 2b, to bias the base member 19A in the direction for locking the rotation of the supply reel 4.

Moreover, in the fourth embodiment, the take-up reel engaging pawl 20b, which is structured integrally with the base member 19A, as illustrated in FIG. 26, is formed into an arm shape, and is structured so as to have elasticity.

Moreover, in the fourth embodiment, the horizontal-pull coating film transferring tool 1A is provided with a limiting portion 193 for preventing further rotation of the base member 19A from the position wherein the rotational lock of the supply reel 4 by the rotation locking member 20 is released, in the state wherein the transfer head 5A is pressed against the transfer surface at the time of use.

In the fourth embodiment, as illustrated in FIG. 29(b) and FIG. 29(c), this limiting portion 193 is formed integrally with the base member 19A, and is arranged so as to protrude downward from the bottom face of the base member 19A.

More specifically, the limiting portion 193 is provided to the rear of the supporting shaft 19a in the vicinity of the supporting shaft 19a of the base member 19A.

In the horizontal-pull coating film transferring tool 1A that is provided with the limiting portion 193, described above, when not in use, the base member 19A will be biased so that the back end side will be lifted further upward than the supporting shaft 19a, by the torsion coil spring 194, as illustrated in FIG. 29(b), so that the supply reel engaging pawl 20a of the rotation locking member 20 will engage with an engaging tooth 18c of the flange 18 that rotates integrally with the supply reel 4. The rotation of the supply reel 4 is locked thereby. Moreover, in this state a prescribed gap S is formed between the limiting portion 193 and the inner surface of the bottom case member 2b.

On the other hand, when the horizontal-pull coating film transferring tool 1A is in use (when transferring the coating film), as illustrated in FIG. 29(c), the base member 19A is rotated around the supporting shaft 19a, as the support point, so that the transfer head 5A moves upward, against the biasing force of the torsion coil spring 194, through the transfer head 5A being pressed against the transfer-destination surface. At this time, the rotation locking member 20 that is disposed on the side opposite from the transfer head 5A in relation to the supporting shaft 19a, moves downward, so that the supply reel engaging pawl 20a, which had been engaged with an engaging tooth 18c when not in use, moves away from the engaging tooth 18c, releasing the rotational lock of the supply reel 4.

Moreover, in a state wherein the base member 19A has rotated to a position wherein the rotational lock of the supply reel 4 by the rotation locking member 20 has been released, the limiting portion 193 contacts the inner surface of the case member 2b, and thus further rotation of the base member 19A is limited thereby.

Note that, as described above, in the fourth embodiment the take-up reel engaging pawl 20b is formed in the shape of an arm, and has elasticity. This enables the elastic deformation of the take-up reel engaging pawl 20b, to enable rotation of the take-up reel 6 in the take-up direction, even in a state wherein the engagement between the supply reel engaging pawl 20a and the engaging tooth 18a of the flange 18 of the supply reel 4 has not been released, when taking up slack when not in use.

Given the horizontal-pull coating film transferring tool 1A according to the fourth embodiment, explained above, there are the effects set forth below, in addition to the same effects as in the first embodiment.

The horizontal-pull coating film transferring tool 1A is structured including a limiting portion 193 that prevents further rotation of the base member 19A from the position wherein the rotational lock of the supply reel 4 is released. Through this, when transferring the coating film to the transfer target, when the transfer head 5A that is attached to the tip end of the base member 19A is pressed against the transfer target, the base member 19A moves with a seesaw motion with the supporting shaft 19a as the support point, so the back end side thereof is pressed downward. Given this, when the limiting portion 193 makes contact with the case member 2b, arriving at the position wherein the rotation of the base member 19A is constrained, the rotational lock of the supply reel 4 is released, enabling the coating film to be transferred by the transfer head 5A. Here the limiting portion 193 (the base member 19A) and the case member 2b make direct contact, with no elastic body for absorbing pressure, such as a cushion, or the like, is interposed. Because of this, because the case member 2b and the limiting portion 193 (the base member 19A) are structured from hard members, and the force that is applied in order to transfer the coating film is relayed reliably to the transfer head 5A, when transferring the coating film there will be less of a tendency for there to be extraneous pivoting, or the like, of the transfer head 5A.

In other words, when the coating film is transferred through pressing the transfer head 5A against the transfer-destination surface, further rotation of the base member 19A from the position wherein the rotational lock of the supply reel 4 is released is prevented. Through this, excessive motion of the transfer head 5A in the direction of pressing (the vertical direction) is prevented in the state wherein the coating film is being transferred, stabilizing the position of the transfer head 5A at the time of transfer of the coating film, enabling the coating film to be transferred properly to the transfer target.

Moreover, one factor that causes the transfer of coating film by the coating film transferring tool to not be performed properly is that the hand that holds the coating film transferring tool pivots slightly to the left and right, so that the leading edge of the transfer head cannot contact the transfer-destination surface properly. In such a case, one side of the transfer head will be in a floating state, so there will be a bias in the coating film. Given this, the transfer head 5A is attached to the base member 19A that is able to rotate, with the axis that extends in the front/rear direction (the first protruding portion 191) as the rotational axis. Through this, the transfer surface of the transfer head 5A is able to deflect to the left and to the right around this rotational axis. Through this, the ability of the transfer surface of the transfer head 5A to conform to the transfer-destination surface is improved, enabling the transfer of the coating film to be carried out properly, that is, the tendency for biased transfer to occur is reduced.

That is, even if, during the transfer of the coating film, the horizontal-pull coating film transferring tool 1A were to be tilted slightly to the left or to the right, if a force is applied in the downward direction, the tip end edge of the transfer head 5A will correct the tilt of the base member 19A, enabling the transfer head 5A to contact the transfer-destination surface properly.

Moreover, in the fourth embodiment, the load that is necessary in order to rotate the base member 19A to the position wherein further rotation is prevented by the limiting portion 193 from the position wherein the rotational lock of the supply reel 4 is released is set, by the torsion coil spring 194 (the elastic return mechanism), so as to be less than the load required for causing the coating film to be coated onto the transfer-destination surface. Through this, the coating film is not coated within a range wherein the elastic force of the elastic return mechanism (the torsion coil spring 194) operates, and thus, in the state wherein the transfer of the coating film is carried out, pivoting of the transfer head 5A (that is, the existence of cushioning) is prevented.

Moreover, the fourth embodiment, the elastic return mechanism is structured through a torsion coil spring 194. Given this, when compared to a case wherein the elastic return mechanism is structured from a compression spring, the force (the elastic force) that acts in the direction in which the top case member 2a and the bottom case member 2b, which are fitted together, will open is reduced. This makes it possible to achieve a horizontal-pull coating film transferring tool 1A wherein the fit between the top case member 2a and the bottom case member 2b is not opened unintentionally.

When it comes to the limiting portion 193 explained in the fourth embodiment, the same limiting portion may be provided in the horizontal-pull coating film transferring tools of the first through third embodiments as well, although not illustrated, and of the fifth embodiment. That is, the effects described above can be produced through the limiting portion in the horizontal-pull coating film transferring tool in the first through third embodiments as well.

A fifth embodiment of a horizontal-pull coating film transferring tool according to the present invention will be explained next in reference to FIG. 30. The horizontal-pull coating film transferring tool 1B according to the fifth embodiment differs from that of the fourth embodiment in the point that the base member 19B is biased by a tensioning spring 195 rather than by the torsion coil spring 194.

As illustrated in FIG. 30, the rotational locking member 20 is biased in the direction of locking the rotation of the supply reel 4 by the tensioning spring 195. More specifically, the tensioning spring 195 comprises: a coil portion 195a, a first spring portion 195b that extends in the axial direction of the coil portion 195a from one end side of the coil portion 195a, and a second spring portion 195c that extends in the axial direction of the coil portion 195a from the other end side of the coil portion 195a. Moreover, in the fifth embodiment, the bottom case member 2b is structured including a catching member 196 that extends upward from the inner surface thereof, and that has a hook portion formed on the tip end side thereof. Additionally, the tensioning spring 195 is not only disposed with the axial direction of the coil portion 195a along the vertical direction, but also the first spring portion 195b is secured to the top face side of the base member 19B and the second spring portion 195c is secured to the catching member 196, to bias the base member 19B in the direction of locking of the rotation of the supply reel 4.

Given the horizontal-pull coating film transferring tool 1B according to the fifth embodiment, when not in use, as illustrated in FIG. 30(b), the base member 19B is pulled, by the tensioning spring 195, so that the back end side will be higher than the supporting shaft 19a, so that the supply reel engaging pawl 20a of the rotational locking member 20 engages with an engaging tooth 18c of the flange 18 that rotates together with the supply reel 4. The rotation of the supply reel 4 is locked thereby. Moreover, in this state a prescribed gap S is formed between the limiting portion 193 and the inner surface of the bottom case member 2b.

On the other hand, when the horizontal-pull coating film transferring tool 1B is in use (when transferring the coating film), as illustrated in FIG. 30(c), the base member 19B is rotated around the supporting shaft 19a, as the support point, so that the transfer head 5B moves upward, against the tensioning force of the tensioning spring 195, through the transfer head 5B being pressed against the transfer-destination surface. At this time, the rotation locking member 20 that is disposed on the side opposite from the transfer head 5B in relation to the supporting shaft 19a, moves downward, so that the supply reel engaging pawl 20a, which had been engaged with an engaging tooth 18c when not in use, moves away from the engaging tooth 18c, releasing the rotational lock of the supply reel 4.

Moreover, in a state wherein the base member 19B has rotated to a position wherein the rotational lock of the supply reel 4 by the rotation locking member 20 has been released, the limiting portion 193 contacts the inner surface of the case member 2b, and thus further rotation of the base member 19B is limited thereby.

Given the horizontal-pull coating film transferring tool 1B according to the fifth embodiment, explained above, there are the effects set forth below, in addition to the same effects as in the fourth embodiment.

The fifth embodiment, the elastic return mechanism is structured through a tensioning spring 195. Given this, the base member 19B is biased in the direction for locking the rotation of the supply reel 4, without producing a force (an elastic force) that acts in the direction in which the top case member 2a and the bottom case member 2b, which are fitted together. This makes it possible to prevent unintentional opening of the fit between the top case member 2a and the bottom case member 2b.

Moreover, while the horizontal-pull coating film transferring tool according to the present invention was explained using the first embodiment through the fifth embodiment as typical embodiments, the present invention is not limited thereto. For example, embodiments such as the following are also included within the scope of technology of the present invention.

(1) A horizontal-pull coating film transferring tool structured so that the power transmitting mechanism is structured from a plurality of gears, wherein a gear engaging pawl, for engaging an engaging tooth that is provided on an arbitrary gear, from among the plurality of gears, is provided, wherein, when the transfer head is pressed against the transfer-destination surface, the base member rotates, to release the engagement of the engaging tooth and the gear engaging pawl, so that the rotational lock of the take-up gear is released, and when the pressure on the transfer head is removed, the base member is returned to the original position through the elastic return mechanism, so that the gear engaging pawl will be engaged with the engaging tooth, so that the rotation of the take-up reel will be locked.

(2) A horizontal-pull coating film transferring tool in (1), structured so that, through the rotation of the base member when the transfer head is pressed against the transfer-destination surface, the engagement of the gear engaging pawl with an engaging tooth that is provided in an arbitrary gear of the plurality of gears that structure the power transmitting mechanism is released prior to the engagement of the supply reel engaging pawl, to release the rotational lock of the take-up reel.

(3) A horizontal-pull coating film transferring tool as set forth in (1) or (2), wherein the gear engaging pawl is provided protruding in a direction that is substantially perpendicular to the direction of the front end pressing edge portion in the transfer head for pressing the transfer tape against the transfer-destination surface.

(4) The engaging teeth that are provided on a flange that rotates together with the supply reel, and that engage the supply reel engaging pawl, in the rotation locking member may have shapes that are provided on the circular surface of the flange, rather than shapes that are provided on the peripheral edge of the flange. Moreover, engaging teeth may be provided on the circular surface of the supply reel. Furthermore, the flange may be formed integrally with the supply reel. Note that here the "peripheral edge" includes the peripheral end face as well.

(5) In the same manner as in (4), above, the engaging teeth that are provided on a flange that rotates together with the take-up reel, and that engage the take-up reel engaging pawl, in the rotation locking member may have shapes that are provided on a circular surface of the flange, rather than shapes that are provided on the peripheral edge of the flange. Note that here the "peripheral edge" includes the peripheral end face as well.

(6) Moreover, there is no particular limitation on the specific shapes of the supply reel engaging pawl, the take-up reel engaging pawl, and the engaging teeth that engage these engagement pawls, insofar as they are functional. There is no particular limitation on the specific shapes of the supply reel engaging pawl and the engaging teeth that engage this engaging pawl insofar as the rotation in at least the direction in which the transfer tape that is rolled onto the supply reel is pulled off is locked. There is no particular limitation on the specific shapes of the take-up reel engaging pawl or of the engaging teeth that engage this engaging pawl, insofar as the rotation in at least the direction opposite of the direction in which the transfer tape is rolled is locked.

(7) While in the embodiments the rotation supporting shafts for the supply reel in the take-up reel were illustrated as separate units, the present invention includes also the supply reel and the take-up reel being borne by the same rotation supporting shaft.

(8) The elastic return mechanism according to the present invention is not limited to being a compression spring, but rather an arbitrary material that has another elastic return effect, such as a tensioning spring, may be used. The elastic return mechanism may be formed integrally with the base unit or the case member.

The present disclosure may include one or more of the following concepts:

Paragraph A. A horizontal-pull coating film transferring tool comprising, within a case, a supply reel on which a transfer tape is rolled, a transfer head for transferring, to a transfer-destination surface, a transfer tape that is pulled from the supply reel, a take-up reel for rolling up the transfer tape after transferring, and a power transmitting mechanism for causing the supply reel and the take-up reel to operate in coordination, structured so that:

a base member wherein a transfer head is attached, either integrally or replaceably through a cartridge system, to the front end and wherein a rotation locking member having a supply reel engaging pawl able to lock the rotation of the supply reel is disposed, in the back half portion, so as to operate either directly or through a linkage, is supported between the transfer head and the rotation locking member so as to be able to rotate on a base member pivoting supporting portion that is provided in a prescribed position in the case, is structured so that, through an elastic return mechanism between the base member and the case, the rotational lock of the supply reel is released through rotation of the base member when the transfer head is pressed against the transfer-destination surface and the rotation of the supply reel is locked through the base member returning to the original position through the elastic return mechanism, and wherein a rotation supporting shaft for the supply reel and the take-up reel is disposed so as to be substantially perpendicular to the direction of a pressing edge portion on the front end in the transfer head, for pressing the transfer tape against the transfer-destination surface.

Paragraph B. A horizontal-pull coating film transferring tool as set forth in Paragraph A, structured so that the supply reel engaging pawl in the rotation locking member is a supply reel engaging pawl able to engage with an engaging tooth that is provided on the circular face or a peripheral edge of a flange that is formed integrally with the supply reel, and through the engagement between the engaging tooth and the supply reel engaging pawl being disengaged through rotation of the base member when the transfer head is pressed against the transfer destination surface, the rotational lock of the supply reel is released, and when the pressure on the transfer head is removed, the base member is returned to the original position by the elastic return mechanism, and the supply reel engaging pawl engages the engaging tooth, locking the rotation of the supply reel.

Paragraph C. A horizontal-pull coating film transferring tool as set forth in Paragraph A or B, structured so that a take-up reel engaging pawl able to engage with an engaging tooth that is provided on the circular face or a peripheral edge of a flange that is formed integrally with the take-up reel is provided in the rotation locking member, and through the engagement between the engaging tooth and the take-up reel engaging pawl being disengaged through rotation of the base member when the transfer head is pressed against the transfer destination surface, the rotational lock of the take-up reel is released, and when the pressure on the transfer head is removed, the base member is returned to the original position by the elastic return mechanism, and the take-up reel engaging pawl engages the engaging tooth, locking the rotation of the take-up reel.

Paragraph D. A horizontal-pull coating film transferring tool as set forth in Paragraph A or B, structured so that the power transmitting mechanism is structured from a plurality of gears, wherein a gear engaging pawl, for engaging an engaging tooth that is provided on an arbitrary gear, from among the plurality of gears, is provided, wherein, when the transfer head is pressed against the transfer-destination surface, the base member rotates, to release the engagement of the engaging tooth and the gear engaging pawl, so that the rotational lock of the take-up gear is released, and when the pressure on the transfer head is removed, the base member is returned to the original position through the elastic return mechanism, so that the gear engaging pawl will be engaged with the engaging tooth, so that the rotation of the take-up reel will be locked.

Paragraph E. A horizontal-pull coating film transferring tool as set forth in Paragraph C, which is dependent on Paragraph B, or in Paragraph D, which is dependent on Paragraph B, structured so that the engagement of the engaging tooth of the flange of the take-up reel and the take-up reel engaging pawl, or the engagement of the engaging tooth that is provided in an arbitrary gear, of the plurality of gears that structure the power transmitting mechanism, and the gear engaging pawl, is released by the rotation of the base member, to release the rotational lock of the take-up reel, when the transfer head is pressed against the transfer destination surface prior to the engagement of the engaging tooth of the supply reel and the supply reel engaging pawl.

Paragraph F. A horizontal-pull coating film transferring tool as set forth in any of Paragraphs B through E, structured so that the supply reel engaging pawl, take-up reel engaging pawl, and/or gear engaging pawl is provided protruding in a direction that is substantially perpendicular in relation to the direction of the front edge portion of the front end of the transfer head for pressing the transfer tape against the transfer destination surface.

Paragraph G. A horizontal-pull coating film transferring tool as set forth in any of Paragraphs A through F, structured so that the base member is disposed in a space between the lengthwise-direction axis of the transfer head and the rotation-supporting shaft of the take-up reel.

Paragraph H. A horizontal-pull coating film transferring tool as set forth in any of Paragraphs A through G, further comprising: a limiting portion for limiting further rotation of the base member from the position wherein the rotational lock of the supply reel has been released by the rotation locking member in a state wherein the transfer head is pressed against the transfer destination surface.

Paragraph I. A horizontal-pull coating film transferring tool as set forth in any of Paragraphs A through H, wherein: the transfer head is attached to the base member so as to be able to rotate with a shaft that extends in the front/rear direction of the transfer head as the rotational axis.

Paragraph J. A horizontal-pull coating film transferring tool as set forth in any of Paragraphs A through I, wherein: the elastic return mechanism is structured from a torsion coil spring or a tensioning spring.

Paragraph K. A horizontal-pull coating film transferring tool as set forth in any of Paragraphs H through J, wherein: the load required to cause the base member to rotate from the position wherein the rotational lock of the supply reel has been released to the position wherein further rotation is limited by the limiting portion is set, by the elastic return mechanism, so as to be less than the load required for the coating film to be coated onto the transfer destination surface.

In one or more embodiments of the present invention, it may be desired to provide a horizontal-pull coating film transferring tool able to prevent effectively the stringing phenomenon through properly severing the transfer tape after a transfer operation.

In one or more embodiments of the present invention, a base member 19 wherein a transfer head 5 is attached to the front end and wherein a rotation locking member 20 having a supply reel engaging pawl 20a able to lock the rotation of the supply reel 4 is disposed, in the back half portion, is supported so as to be able to rotate on a base member pivoting supporting portion 21 that is provided in a case, structured so that the rotational lock of the supply reel is released through rotation of the base member when the transfer head is pressed against the transfer-destination surface and the rotation of the supply reel is locked through the base member returning to the original position through a compression spring 23a, and wherein rotation supporting shafts 8 and 13 for the supply reel and the take-up reel are disposed so as to be substantially perpendicular to the direction of a pressing edge portion 5a on the front end of the transfer head.

Below are illustrative, non-exclusive explanations of reference symbols used in connection with embodiments of the present invention.

1. Horizontal-pull Coating Film Transferring Tool
1A: Horizontal-pull Coating Film Transferring Tool
1B: Horizontal-pull Coating Film Transferring Tool
2: Case
2a, 2b: Case Members
2c: Small Fitting Piece
2d: Recessed Fitting Portion
2e: Opening Window
3: Transfer Tape
4: Supply Reel
4a: Rib-Shaped Locking Portion
5: Transfer Head
5A: Transfer Head
5B: Transfer Head
5a: Pressing Edge Portion
5b: Lengthwise Axis of Transfer Head
6: Take-Up Reel
6a, 6b: Flanges
6c: Engaging Tooth
7: Supply Reel Gear
7a: Engaging Portion
7b: Axle
7c: Flat Portion
8: Rotation Supporting Shafts for Supply Reel
9: Compression Spring
10: First Spacer
10a: Inner Hole
11: Elastic Stopper
11a: Engaging Protrusion
12: Second Spacer
12a: Inner Hole
13: Rotation Supporting Shaft for Take-up Reel
14: Take-up Reel Gear
15: First Small Gear
16: Second Small Gear
17: Power Transmitting Mechanism
18: Flange
18a: Notch
18b: Attaching Piece
18c: Engaging Tooth
19: Base Member
19A: Base Member
19B: Base Member
19a: Supporting Shaft
19b: Hole Portion
19c: Top Face
20: Rotation Locking Member
20a: Supply Reel Engaging Pawl
20b: Take-Up Reel Engaging Pawl
21: Base Member Pivoting Supporting Portion
22: Compression Spring Pin
23: Elastic Return Mechanism
23a: Compression Spring
24: First Guide Pin
25: Second Guide Pin
30: Horizontal-Pull Coating Film Transferring Tool
31: Transfer Head
32: Base Member
32a: Supporting Shaft
33: Rotation Locking Member
33a: Supply Reel Engaging Pawl
34: Case
34a, 34b: Case Members
35: Transfer Tape
36: Supply Reel
37: Take-Up Reel
38: Supply Reel Gear
39: Compression Spring
40: First Spacer
41: Elastic Stopper
42: Second Spacer
43: Flange
43a: Engaging Tooth
44: Take-Up Reel Gear
45: First Small Gear
46: Second Small Gear
50: Horizontal-Pull Coating Film Transferring Tool
51: Transfer Head
52: Base Member
52a: Supporting Shaft
52b: Spring Securing Protrusion
52c: Engaging Portion
53: Rotation Locking Member
53a: Supply Reel Engaging Pawl
53b: Take-Up Reel Engaging Pawl
53c: Supply Reel Engaging Pawl Arm
53d: Take-Up Reel Engaging Pawl Arm
53e: Shaft Cylinder
53f: Engaging Hole
53g: Torsion Spring Securing Plate
53h: Axle Hole 53*i*: Cutaway
53*j*: Reduced Diameter Portion
53*k*: Curved Groove
54: Case
54*a*, 54*b*: Case Members
55: Transfer Tape
56: Supply Reel
57: Take-Up Reel
57*a*: Flange
57*b*: Engaging Tooth
58: Supply Reel Gear
59: Compression Spring
60: First Spacer
61: Elastic Stopper
62: Second Spacer
63: Flange
63*a*: Engaging Tooth
64: Take-Up Reel Gear
65: First Small Gear
66: Second Small Gear
67: Torsion Spring
68: Rotation Locking Member Supporting Shaft
68*a*: Engaging Piece
69: Spring Engaging Portion
70: Compression Spring
71: Base Member Pivoting Supporting Portion
194: Torsion Coil Spring
195: Tensioning Spring Although the present disclosure has been shown and described with reference to the foregoing operational principles and preferred embodiments, it will be apparent to those skilled in the art that various changes in form and detail may be made without departing from the spirit and scope of the disclosure. The present disclosure is intended to embrace all such alternatives, modifications and variances and include all novel and non-obvious combinations and subcombinations of the various elements, features, functions and/or properties disclosed herein. Various combinations and subcombinations of features, functions, elements, and/or properties may be claimed through presentation of a related application.

What is claimed is:

1. A horizontal-pull coating film transferring tool comprising, within a case, a supply reel on which a transfer tape is rolled, a transfer head configured for transferring, to a transfer-destination surface, a transfer tape that is pulled from the supply reel, a take-up reel configured for rolling up the transfer tape after transferring, and a power transmitting mechanism configured for causing the supply reel and the take-up reel to operate in coordination, structured so that:
    a base member, wherein the transfer head is attached, either integrally or replaceably through a cartridge system, to a front end of the base member and wherein a rotation locking member having a supply reel engaging pawl able to lock rotation of the supply reel is disposed, in a back half portion of the base member, so as to operate either directly or through a linkage, the base member being supported between the transfer head and the rotation locking member so as to be able to rotate on a base member pivoting supporting portion disposed in a prescribed position in the case;
    wherein, through an elastic return mechanism between the base member and the case, a rotational lock of the supply reel is released through rotation of the base member when the transfer head is pressed against the transfer-destination surface and the rotation of the supply reel is locked through the base member returning to an original position through the elastic return mechanism; and
    wherein a rotation supporting shaft for the supply reel and the take-up reel is disposed so as to be substantially perpendicular to the direction of a pressing edge portion on the front end in the transfer head, configured for pressing the transfer tape against the transfer-destination surface.

2. The horizontal-pull coating film transferring tool of claim 1, wherein the supply reel engaging pawl in the rotation locking member is configured to engage with a first engaging tooth that is disposed on a circular face of a flange or a peripheral edge of the flange that is formed integrally with the supply reel, and through the engagement between the first engaging tooth and the supply reel engaging pawl being disengaged through rotation of the base member when the transfer head is pressed against the transfer destination surface, the rotational lock of the supply reel is released, and when the pressure on the transfer head is removed, the base member is returned to the original position by the elastic return mechanism, and the supply reel engaging pawl engages the first engaging tooth, locking the rotation of the supply reel.

3. The horizontal-pull coating film transferring tool of claim 2, wherein a take-up reel engaging pawl configured to engage with a second engaging tooth provided on the circular face of the flange or the peripheral edge of the flange that is formed integrally with the take-up reel is disposed on the rotation locking member, and through the engagement between the second engaging tooth and the take-up reel engaging pawl being disengaged through rotation of the base member when the transfer head is pressed against the transfer destination surface, the rotational lock of the take-up reel is released, and when the pressure on the transfer head is removed, the base member is returned to the original position by the elastic return mechanism, and the take-up reel engaging pawl engages the second engaging tooth, locking the rotation of the take-up reel.

4. The horizontal-pull coating film transferring tool of claim 3, wherein the power transmitting mechanism comprises a plurality of gears, wherein a gear engaging pawl, configured for engaging a third engaging tooth that is provided on an arbitrary gear, from among the plurality of gears, is provided, wherein, when the transfer head is pressed against the transfer-destination surface, the base member rotates, to release the engagement of the third engaging tooth and the gear engaging pawl, so that the rotational lock of a take-up gear is released, and when the pressure on the transfer head is removed, the base member is returned to the original position through the elastic return mechanism, so that the gear engaging pawl is engaged with the third engaging tooth, locking the rotation of the take-up reel.

5. The horizontal-pull coating film transferring tool of claim 3, wherein the engagement of the second engaging tooth of the flange of the take-up reel and the take-up reel engaging pawl is released by the rotation of the base member, to release the rotational lock of the take-up reel, when the transfer head is pressed against the transfer destination surface prior to the engagement of the first engaging tooth of the supply reel and the supply reel engaging pawl.

6. The horizontal-pull coating film transferring tool of claim 3, wherein the supply reel engaging pawl and/or the take-up reel engaging pawl is provided protruding in a direction that is substantially perpendicular in relation to the direction of a front edge portion of the front end of the transfer head for pressing the transfer tape against the transfer destination surface.

7. The horizontal-pull coating film transferring tool of claim 6, wherein the base member is disposed in a space between a lengthwise-direction axis of the transfer head and the rotation-supporting shaft of the take-up reel.

8. The horizontal-pull coating film transferring tool of claim 7, further comprising: a limiting portion configured for limiting further rotation of the base member from the position wherein the rotational lock of the supply reel has been released by the rotation locking member in a state wherein the transfer head is pressed against the transfer destination surface.

9. The horizontal-pull coating film transferring tool of claim 1, wherein: the transfer head is rotatably attached to the base member on a rotational axis that extends in a front/rear direction of the transfer head.

10. The horizontal-pull coating film transferring tool of claim 1, wherein: the elastic return mechanism is structured from one of a torsion coil spring or a tensioning spring.

11. The horizontal-pull coating film transferring tool of claim 1, wherein: the load required to cause the base member to rotate from the position wherein the rotational lock of the supply reel has been released to the position wherein further rotation is limited by the limiting portion is set, by the elastic return mechanism, so as to be less than a load required for the coating film to be coated onto the transfer destination surface.

12. The horizontal-pull coating film transferring tool of claim 1, wherein a take-up reel engaging pawl able to engage with a second engaging tooth that is provided on a circular face or a peripheral edge of a flange that is formed integrally with the take-up reel is provided in the rotation locking member, and through the engagement between the second engaging tooth and the take-up reel engaging pawl being disengaged through rotation of the base member when the transfer head is pressed against the transfer destination surface, the rotational lock of the take-up reel is released, and when the pressure on the transfer head is removed, the base member is returned to the original position by the elastic return mechanism, and the take-up reel engaging pawl engages the second engaging tooth, locking the rotation of the take-up reel.

13. The horizontal-pull coating film transferring tool of claim 12, wherein the engagement of the second engaging tooth of the flange of the take-up reel and the take-up reel engaging pawl, or the engagement of a third engaging tooth that is provided in an arbitrary gear, of the plurality of gears that structure the power transmitting mechanism, and a gear engaging pawl, is released by the rotation of the base member, to release the rotational lock of the take-up reel, when the transfer head is pressed against the transfer destination surface prior to the engagement of a first engaging tooth of the supply reel and a supply reel engaging pawl.

14. The horizontal-pull coating film transferring tool of claim 1, wherein the power transmitting mechanism is structured from a plurality of gears, wherein a gear engaging pawl, configured for engaging a third engaging tooth that is provided on an arbitrary gear, from among the plurality of gears, is provided, wherein, when the transfer head is pressed against the transfer-destination surface, the base member rotates, to release the engagement of the third engaging tooth and the gear engaging pawl, so that the rotational lock of the take-up gear is released, and when the pressure on the transfer head is removed, the base member is returned to the original position through the elastic return mechanism, so that the gear engaging pawl will be engaged with the third engaging tooth, locking the rotation of the take-up reel.

15. The horizontal-pull coating film transferring tool of claim 14, wherein the gear engaging pawl is provided protruding in a direction that is substantially perpendicular in relation to the direction of a front edge portion of the front end of the transfer head for pressing the transfer tape against the transfer destination surface.

16. The horizontal-pull coating film transferring tool of claim 1, wherein the base member is disposed in a space between a lengthwise-direction axis of the transfer head and the rotation-supporting shaft of the take-up reel.

17. The horizontal-pull coating film transferring tool of claim 1, further comprising: a limiting portion configured for limiting further rotation of the base member from the position wherein the rotational lock of the supply reel has been released by the rotation locking member in a state wherein the transfer head is pressed against the transfer destination surface.

18. The horizontal-pull coating film transferring tool of claim 17, wherein: the transfer head is attached to the base member so as to be able to rotate with a shaft that extends in the front/rear direction of the transfer head as the rotational axis.

19. The horizontal-pull coating film transferring tool of claim 17, wherein: the load required to cause the base member to rotate from the position wherein the rotational lock of the supply reel has been released to the position wherein further rotation is limited by the limiting portion is set, by the elastic return mechanism, so as to be less than the load required for the coating film to be coated onto the transfer destination surface.

20. The horizontal-pull coating film transferring tool of claim 1, wherein: the elastic return mechanism comprises a torsion coil spring.

* * * * *